United States Patent
Ohshima et al.

[11] Patent Number: 6,157,382
[45] Date of Patent: Dec. 5, 2000

[54] IMAGE DISPLAY METHOD AND APPARATUS THEREFOR

[75] Inventors: Toshikazu Ohshima, Kawasaki; Hiroyuki Yamamoto, Chigasaki; Masakazu Fujiki, Yokohama, all of Japan

[73] Assignee: Canon Kabushiki Kaisha, Tokyo, Japan

[21] Appl. No.: 08/976,514

[22] Filed: Nov. 24, 1997

[30] Foreign Application Priority Data

Nov. 29, 1996 [JP] Japan ................................. 8-319499
Dec. 4, 1996 [JP] Japan ................................. 8-324456

[51] Int. Cl.[7] ............................................. G06F 15/00
[52] U.S. Cl. .................................................. 345/419
[58] Field of Search ............................... 345/419, 420, 345/421, 422, 113, 114; 382/154

[56] References Cited

U.S. PATENT DOCUMENTS

| | | | |
|---|---|---|---|
| 5,446,834 | 8/1995 | Deering | 395/127 |
| 5,528,735 | 6/1996 | Strasnick et al. | 345/427 |
| 5,594,842 | 1/1997 | Kaufman et al. | 345/424 |
| 6,081,271 | 6/2000 | Bardon et al. | 345/419 |

FOREIGN PATENT DOCUMENTS

743589A2  11/1996  European Pat. Off. .

OTHER PUBLICATIONS

Hix, et al., "Pre–Screen Projection: From Concept to Testing of a New Interaction Technique", May 7, 1995, Human Factors in Computing Systems, CHI '95 Conference Proceedings, Denver, pp. 226–233.

Gaver, et al., "A Virtual Window On Media Space", Vity, May 7, 1995, Human Factors in Computing Systems, CHI '95 Conference Proceedings, Denver, pp. 257–264.

*Primary Examiner*—Phu K. Nguyen
*Attorney, Agent, or Firm*—Fitzpatrick, Cella, Harper & Scinto

[57] ABSTRACT

When the direction of the view line of the dominant eye of the operator moves while the operator watches the image display plane of the image display device, the view line direction measuring device measures such movement and the direction of the view field is moved, within the space, in the moving direction of the view line according to the result of calculation by the arithmetic operation unit. Thus, the image display can be obtained with reduced errors caused by the manual operation and with improved operability.

20 Claims, 23 Drawing Sheets

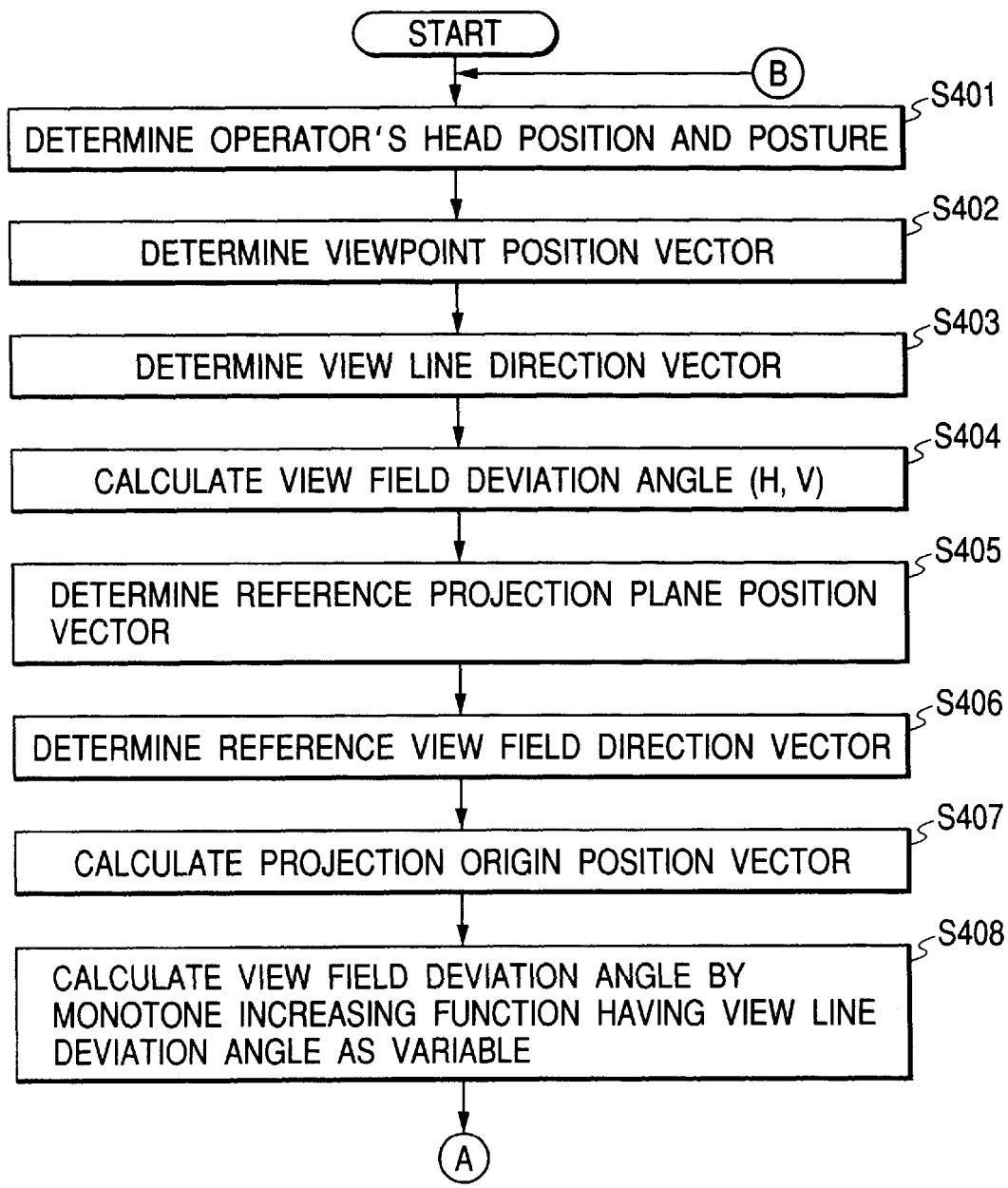

| PATTERN UNIT DATA CONSECUTIVE NUMBERS | TYPE OF PATTERN | PATTERN DATA |
|---|---|---|
| 1 | TRIANGLE | VERTEX COORDINATE, CONNECTION RELATION, COLOR etc. |
| 2 | CHARACTER STRING | FONT DATA, COORDINATE, CHARACTER SIZE |
| 3 | SPHERE | RADIUS, COORDINATE, COLOR, TEXTURE etc. |
| 4 | FREE CURVED SURFACE | CONTROL POINT, COLOR, TEXTURE etc. |
| ... | | |

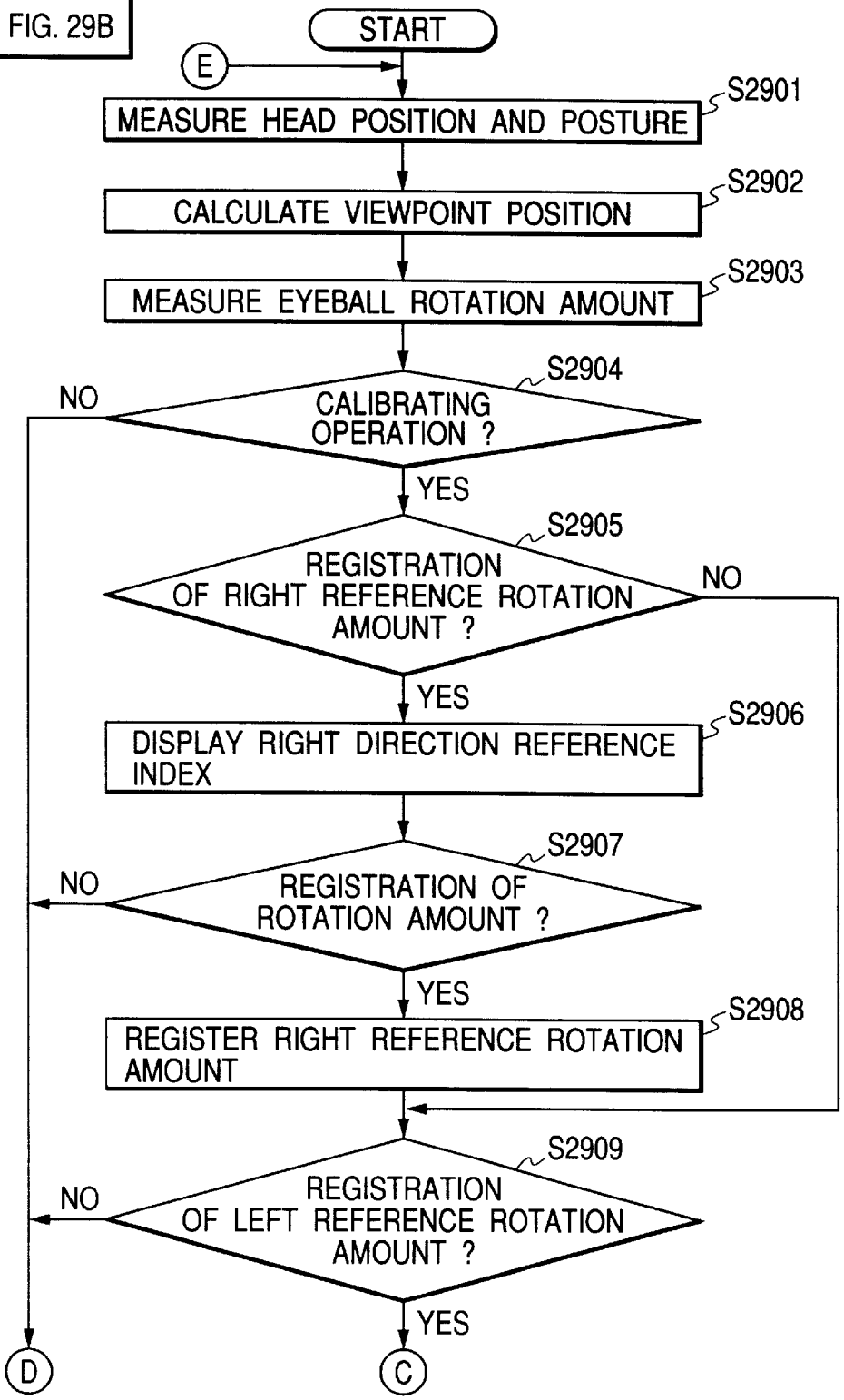

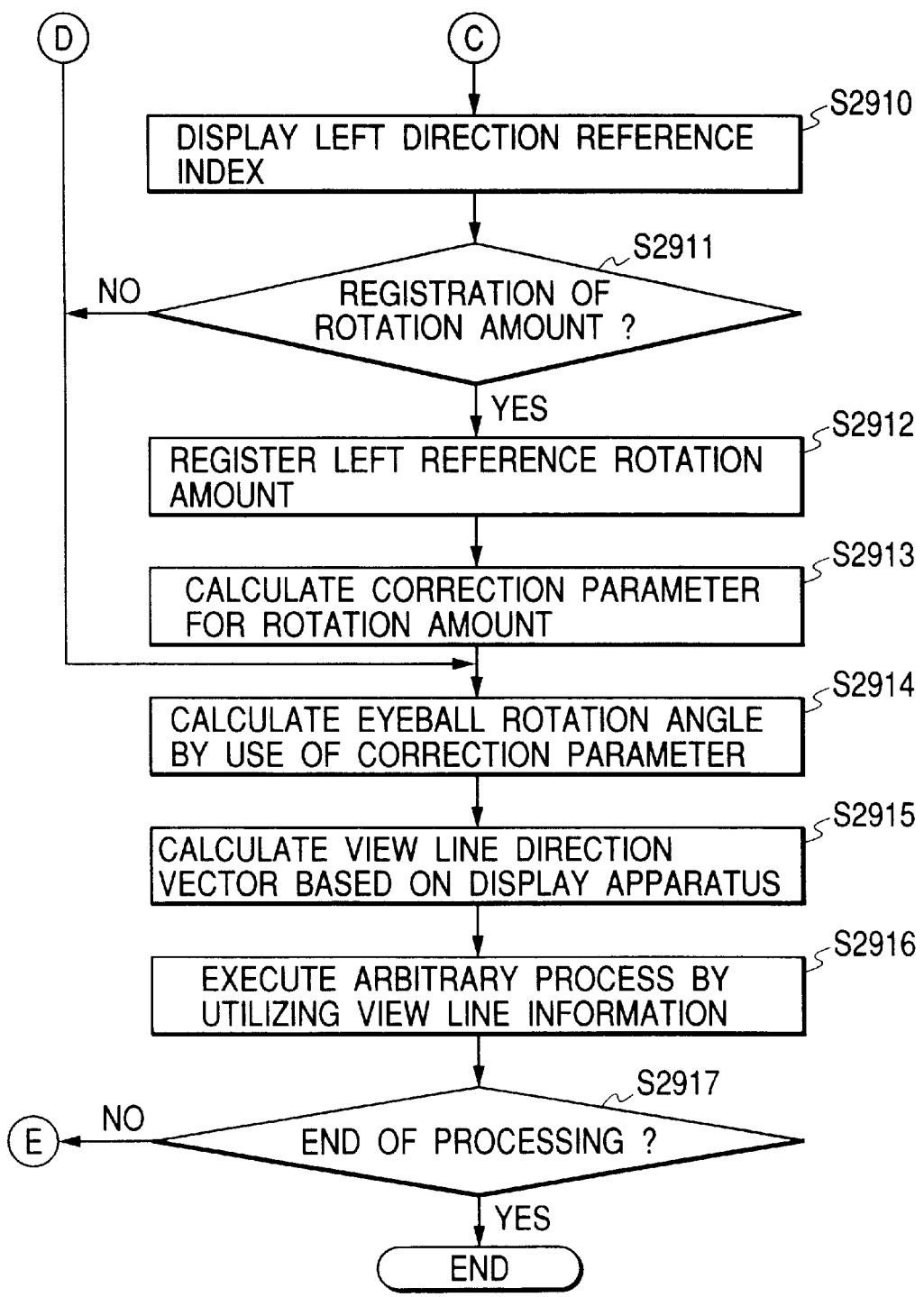

IMAGE DISPLAY METHOD AND APPARATUS THEREFOR

BACKGROUND OF THE INVENTION

1. Field of the Invention

The present invention relates to an image display method and an apparatus therefor, and more particularly an image display method for interpreting geometrical pattern data such as font, planar pattern or stereo pattern defined in the three-dimensional (3D) space, attribute data such as color or pattern thereof, and description data such as data relating to illumination or projection by means of a computer and calculating, generating and displaying an image, and an apparatus therefor.

2. Related Background Art

In the image display method and apparatus for visually displaying the geometrical data defined in the three-dimensional space, it is generally necessary to define the direction of the view field for the visual display and the position of the original point for projection. Such direction of the view field and position of the original point for projection have been designated have been manually controlled for example by a mouse, a joy stick, a keyboard, a track ball or a controller composed of plural switches.

In such conventional system, in case of moving the direction of the view field and the original point for projection at the same time, it has been necessary to manipulate two input devices with two hands at the same time. Therefore, if another operation is also required, the operator has to extend the hand to another input device. Such operation tends to cause confusion in the operator and errors in the applications requiring rapid operations. On the other hand, in order to achieve the movement of the direction of the view field and that of the original point for projection with a single input device, it has been necessary to sacrifice some of the six freedoms in total for the direction of the view field and the position of the original point for projection, or to select the movement of the direction of the view field or that of the original point for projection, by means of a switch.

SUMMARY OF THE INVENTION

In consideration of the foregoing, an object of the present invention is to provide an image display control method and an apparatus therefor, in which the direction of displayed view field is moved by the movement of the view line of an operator, whereby the operator is no longer required to manually control the direction of the view field, and there is achieved an instinct-mating operation that the direction of the view field in the space is moved in the direction of movement of the view line of the operator, namely the direction of the view field is moved to the right when the view line of the operator is moved to the right, thereby reducing the errors in the operation and attaining improved operability.

The above-mentioned object can be attained, according to the present invention, by an image display method comprising:

a view line direction input step of entering the direction of the view line of the operator who observes the displayed image, as a reference direction of the displayed image;

a viewpoint position input step of entering the position of the viewpoint of the operator who observes the displayed image, as a reference position of the displayed image;

a view line deviation angle deriving step of deriving the deviation angle of the view line, between the central axis of the displayed image and the view line of the operator entered in the view line direction input step;

a center point deriving step of deriving a center point for projection in a virtual three-dimensional space to be displayed, based on the position of the viewpoint of the operator entered in the viewpoint position input step and on the center position and the direction of a projection plane, corresponding to the displayed image, in the virtual three-dimensional space to be displayed;

a direction displacing step of displacing the direction of the projection plane, based on the deviation angle of the view line derived in the view line deviation angle deriving step;

an image generating step of generating an image in the direction of the projection plane displaced by the direction displacing step, with the center at the center point derived in the center point deriving step; and an image display step of displaying the image, generated in the image generating step, on the display plane.

Also according to the present invention there is provided an image display apparatus comprising:

view line direction input means for entering the direction of the view line of an operator who observes the displayed image, as a reference direction of the displayed image;

viewpoint position input means for entering the position of the viewpoint of the operator who observes the displayed image, as a reference position of the displayed image;

view line deviation angle deriving means for deriving the deviation angle of the view line, between the central axis of the displayed image and the view line of the operator entered by the view line direction input means;

center point derivation means for deriving a center point for projection in a virtual three-dimensional space to be displayed, based on the position of the viewpoint of the operator entered by the viewpoint position input means and on the center position and the direction of a projection plane, corresponding to the displayed image, in the virtual three-dimensional space to be displayed;

direction displacement means for displacing the direction of the projection plane, based on the deviation angle of the view line derived in the view line deviation angle deriving means;

image generation means for generating an image in the direction of the projection plane displaced by the direction displacement means, with the center at the center point derived in the center point derivation means; and image display means for displaying the image, generated in the image generation means, on the display plane.

Also according to the present invention, there is provided a view line information input method for entering the view line information of an operator who observes the displayed image, featured by determining the position and posture of the head of the operator, with reference to the displayed image, displaying indexes necessary for the calibrating operation in a predetermined position of the displayed image, calculating predetermined correcting parameters based on the amount of rotation of the eyeball when the operator watches the indexes, thereby determining the angle of rotation of the eyeball with reference to the direction of the head of the operator, and determining the crossing point of the view line of the operator with the displayed image based on the angle of rotation of the eyeball as the coordinate watched by the operator.

Also according to the present invention, there is provided a view line information input apparatus for entering the view line information of an operator who observes the displayed image, featured by determining the position and posture of the head of the operator, with reference to the displayed image, displaying indexes necessary for the calibrating operation in a predetermined position of the displayed image, calculating predetermined correcting parameters based on the amount of rotation of the eyeball when the operator watches the indexes, thereby determining the angle of rotation of the eyeball with reference to the direction of the head of the operator, and displaying a coordinate indicating the watching by the operator at the crossing point of the view line of the operator with the displayed image, based on the angle of rotation of the eyeball.

BRIEF DESCRIPTION OF THE DRAWINGS

FIG. 29 comprised of FIG. 29A and FIG. 29B, is a flowchart showing the process flow in the embodiment 4 of the present invention;

DETAILED DESCRIPTION OF THE PREFERRED EMBODIMENTS

Now the present invention will be clarified in detail by preferred embodiments thereof, with reference to the attached drawings.

(a) First Embodiment

In the image generation/display apparatus of the embodiment 1 of the present invention, the position and the posture of the head of the operator, and the direction of view line of a dominant eye thereof are measured and entered by a position and posture detecting device mounted on the head of the operator and an eyeball movement detecting device mounted on the dominant eye of the operator. Based on these information, there are calculated the position of the viewpoint and the direction of view line of the dominant eye, with reference to the image display plane of the display device. This viewpoint position corresponds to the original point of projection at the generation of the image.

Then there are entered the position of the projection plane and the direction of the view field, in the three-dimensional space on the computer. The projection plane corresponds to the image display plane on the image display device.

Then the viewpoint coordinate is transformed, based on the position and direction of the projection plane, into a coordinate represented by the coordinate system in the three-dimensional space defining the pattern to be displayed, and thus transformed coordinate is taken as the coordinate of the original point of projection.

Then the angle between the view line and the axis extending perpendicularly from the center of the image display plane of the image display device is calculated in the horizontal and vertical directions, and such angle is defined as the view line deviation angle.

Then calculated is a monotone increasing function containing the view line deviation angle as a variable, and the direction of the view line is displaced, utilizing the value, obtained by such calculation, as the amount of displacement.

Then there is generated an image consisting of three-dimensional data by perspective projection, based on thus determined positional relationship of the original point of projection and the projection plane, and the generated image is displayed on the image display device.

In the following there will be explained in detail the function of the stereoscopic image display apparatus of the embodiment 1 of the present invention.

Figure 1:
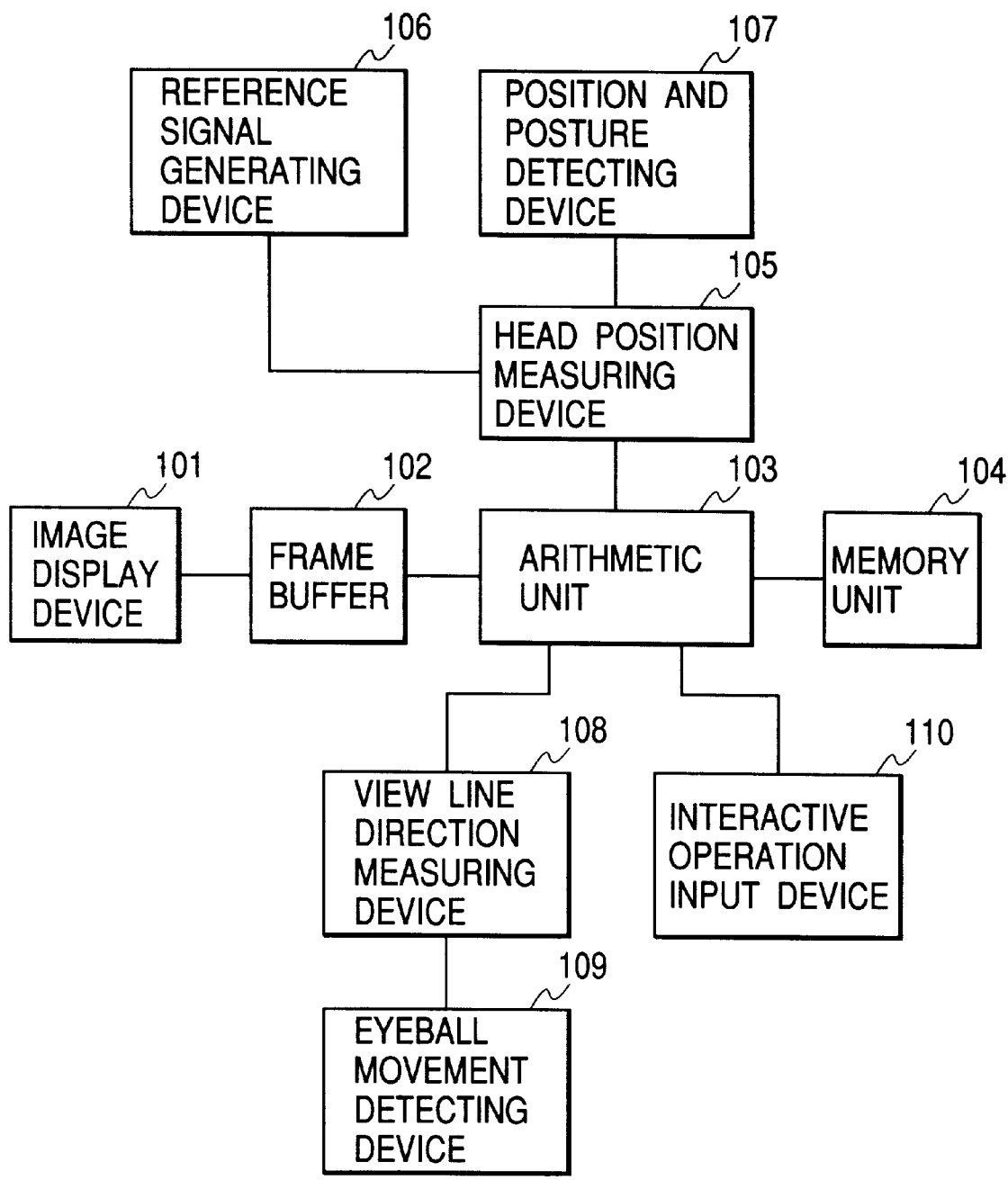
FIG. 1 is a block diagram showing the basic configuration of an embodiment 1 of the present invention.

FIG. 1 is a block diagram showing the basic configuration of the image generation/display apparatus of the embodiment 1.

Referring to FIG. 1, an image display device 101, for presenting an image to the operator, is composed for example of a CRT or an LCD.

A frame buffer 102 stores the image data to be displayed on the image display device 101.

An arithmetic unit 103 generates image data by executing the procedure stored in a memory unit 104 and controls various devices. The image data generated by the arithmetic unit 103 are stored in the frame buffer 102.

A memory unit 104 stores the procedure of processing of the arithmetic unit 103 and the information required for processing. It also provides a memory area for the calculation required in the processing of the arithmetic unit 103.

The memory unit 104 stores a control program represented by a flowchart shown in FIG. 3 as will be explained later, data relating to the pattern to be drawn, and data to be employed in the processing.

A head position measuring device 105 analyzes the signal from a position and posture detecting device 107 and enters the information on the position and posture of the head of the operator, based on a reference signal generation device 106, into the arithmetic unit 103.

A reference signal generation device 106 generates a signal representing the state of a magnetic field, serving as the reference for the position and posture detecting device 107 and sends this signal to the head position measuring device 105.

A position and posture detecting device 107 detects the state of the magnetic field resulting from the change in the position and the posture of the head and sends such state to the head position measuring device 105.

A view line direction measuring device 108 analyzes the signal from an eyeball movement detecting device 109 and sends information on the view line direction of the dominant eye, based on the head, to the arithmetic unit 103.

An eyeball movement detecting device 109 detects the direction of the dominant eye of the operator by infrared irradiation thereto.

An interactive operation input device 110 designates the position of the original point of projection, through manipulation by the operator. It can be composed of any device allowing real-time input by the operator, such as a mouse, a keyboard, a dial box, a tracking ball or a three-dimensional position sensor.

Figure 2:
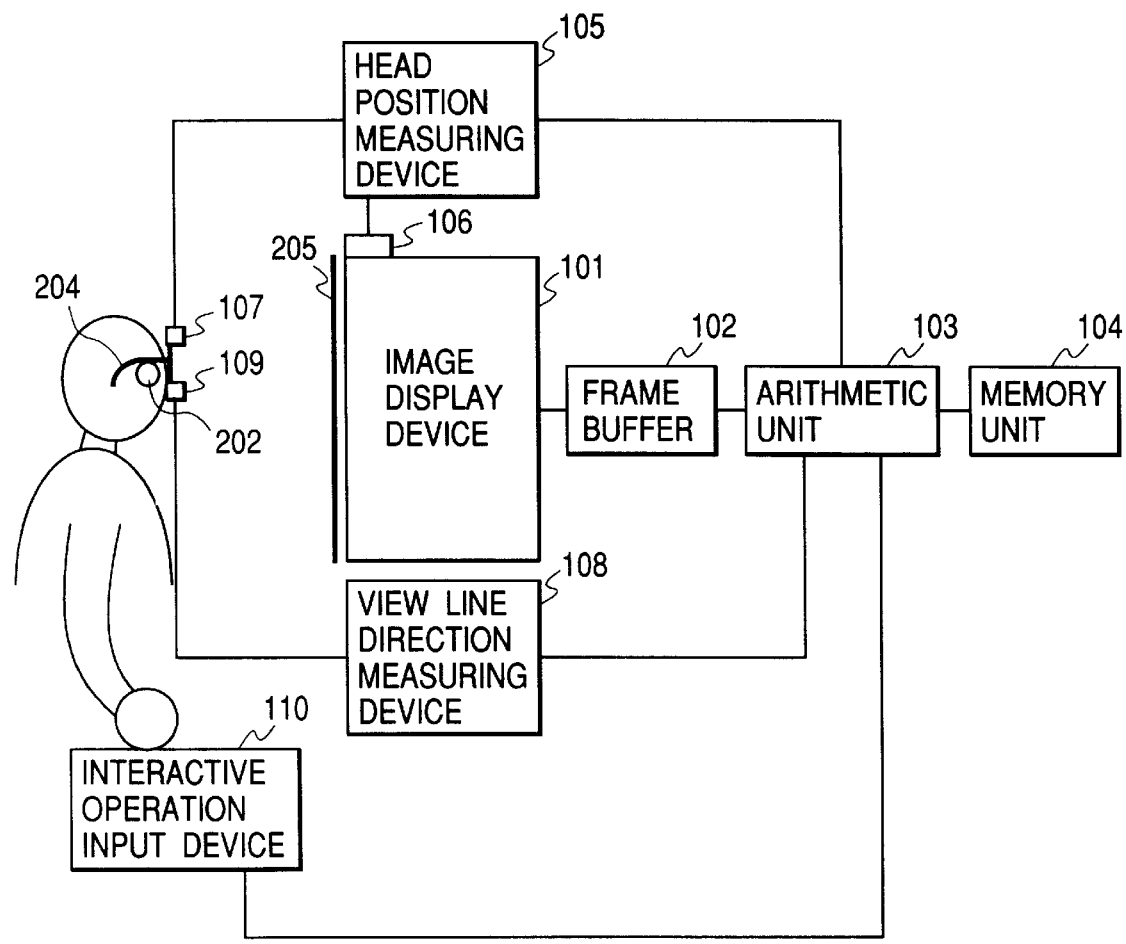
FIG. 2 is a view showing the schematic arrangement of detecting devices of the embodiment 1 of the present invention.

FIG. 2 is a view showing the schematic arrangement of the devices constituting the image generation/display apparatus of the present embodiment 1.

Referring to FIG. 2, the reference signal generating device 106 is fixed on the image display device 101. The reference signal generating device 106 may also provided by another method capable of fixing the relative position with respect to the image display device 101. For example, the reference signal generating device 106 may be fixed on a support member on which the image display device 101 is fixed.

The image display device 101 is provided, at the side of the operator, with an image display plane 205, which is observed by the operator through a detecting device support member 204 of spectacle frame shape.

The position and posture detecting device 107 and the eyeball movement detecting device 109 are fixed, by the detecting device support member 204, on the head of the operator. The eyeball movement detecting device 109 is mounted in front of the eyeball of the dominant eye 202 of the operator.

Other devices may be provided in suitable arbitrary positions.

Figure 3:
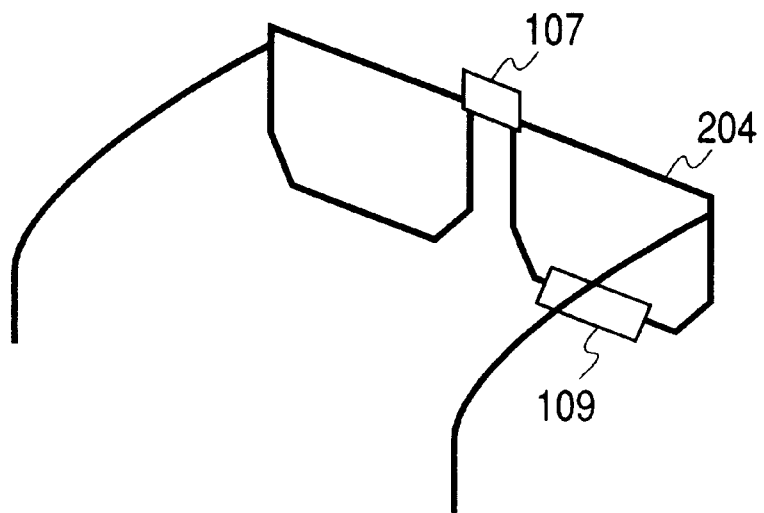
FIG. 3 is a view showing a support member for the detecting devices of the embodiment 1 of the present invention.

FIG. 3 is a view showing the detecting device support member 204. The position and posture detecting device 107 is mounted at the upper center of the frame, while eyeball movement detecting device 109 is mounted under the frame, at the side of the dominant eye of the operator.

Figure 4B:
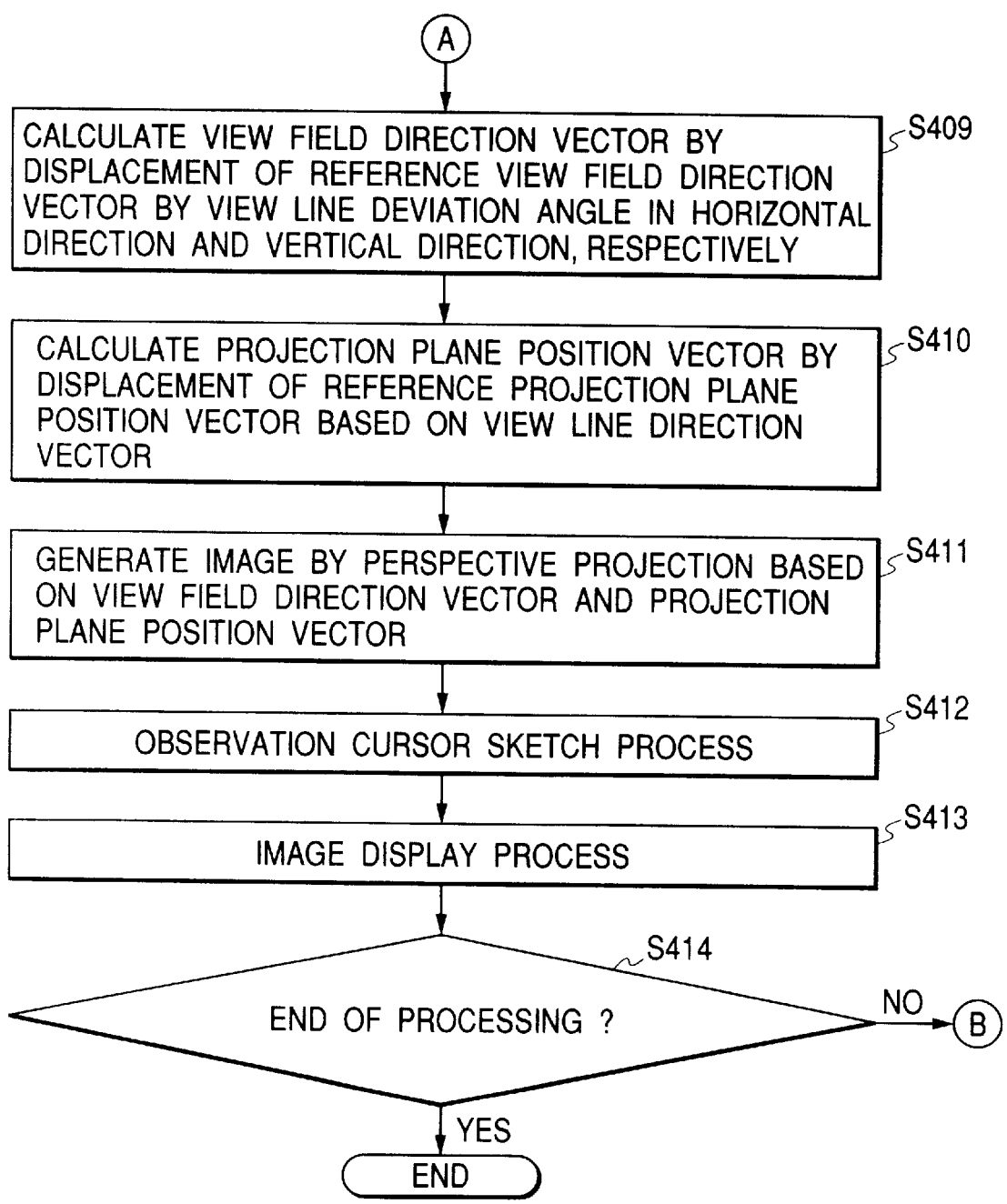
FIG. 4 comprised of FIG. 4A and FIG. 4B, is a flowchart showing the process flow in the embodiment 1 of the present invention.

FIGS. 4A and 4B are flowcharts showing the flow of the image generation/display process in the present embodiment 1. In the present embodiment, the process represented by the flowchart is executed by the arithmetic unit 103 according to the information stored in the memory device 104.

Now the details of the process will be step by step explained in the following.

At first, in a step S401, the head position measuring device 105 measures the change in the position of the head of the operator, based on the state of a magnetic field detected by the position and posture detecting device 107 and utilizing, as the reference, the state of the magnetic field indicated by the signal generated by the reference signal generating device 106, and effects conversion (transformation) into a value based on the image display plane 205 of the image display device. This conversion is executed, based on a coordinate system shown in FIG. 5. Since the reference signal generating device 106 is fixed relative to the image display device 101 as already explained in the foregoing with reference to FIG. 2, the position and the posture with reference to the image display plane 205 of the image display device can be calculated by measuring in advance the positional relationship between the image display device 101 and the reference signal generating device 106.

Figure 5:
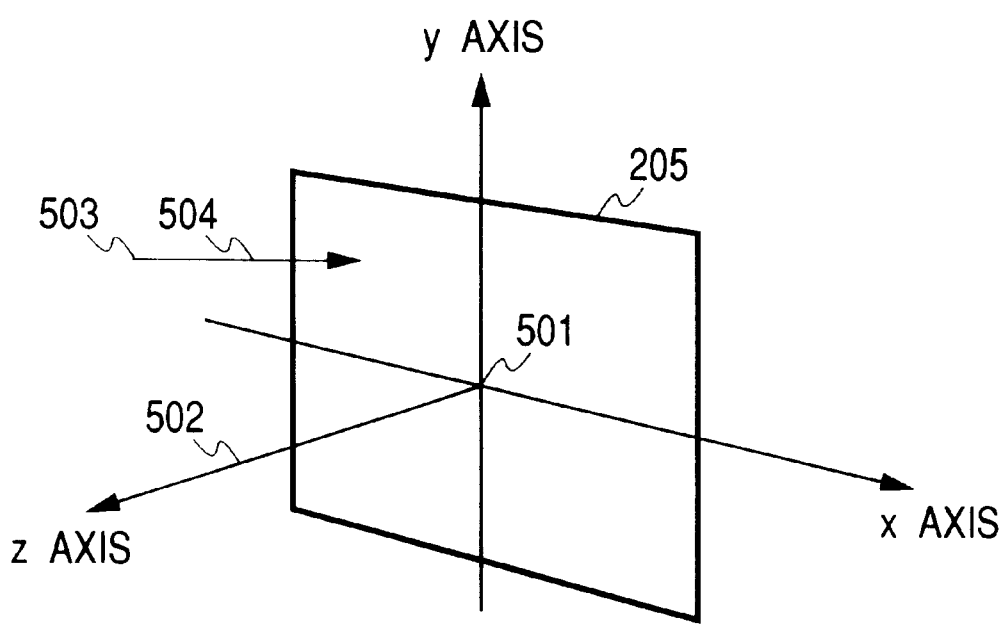
FIG. 5 is a view showing the positional relationship among the viewpoint and the view line of the operator and the image display plane in the embodiment 1 of the present invention.

Then a next step S402 calculates the viewpoint position 503 of the dominant eye 202 of the operator, utilizing the image display plane 205 of the image display device as reference. At first the relative coordinate values of the viewpoint position 503 with respect to the position of the position and posture detecting device 107 are memorized as offset values, and the viewpoint position 503 is determined by adding these offset values to the coordinate values of the position and posture detecting device 107, determined in the step S401. The relationship between the coordinate system of the image display plane 205 of the image display device and the viewpoint position 503 is as shown in FIG. 5.

Then a step 403 calculates the view line direction 504, based on the image display plane 205 of the image display device, based on vector information obtained by analyzing the signal from the eyeball movement detecting device 109 by means of the view line direction measuring device 108 and posture information on the head of the operator, determined in the step S401. The relationship between the coordinate system of the image display plane 205 of the image display device and the view line direction 504 is as shown in FIG. 5.

Figure 6:
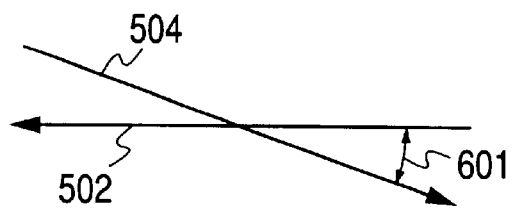
FIG. 6 is a view showing the deviation angle of the view line in the embodiment 1 of the present invention.

A next step S404 determines, as the view line deviation angle 601, the angle between the view line direction 504 and the central axis 502 of the image display plane of the image display device, respectively in each of the horizontal and vertical directions of the image display plane of the image display device. Thus the view line deviation angle 601 has a horizontal component and a vertical component. The relationship among the view line direction 504, the central axis 502 of the image display plane of the image display device and the view line deviation angle 601 is as shown in FIG. 6.

A next step S405 designates, as the position 703 of the reference projection plane, the center position of the projection plane corresponding to the image display plane 205, in a virtual three-dimensional space to be displayed. Such designation may be achieved by manipulation of the interactive input device 101 by the operator or may be made in a fixed manner in advance.

A next step S406 designates, in the virtual three-dimensional space to be displayed, the direction of the normal line to the projection plane corresponding to the image display plane 205 as the reference view field direction 702. Such designation may be achieved by manipulation of the interactive input device 101 by the operator or may be made in a fixed manner in advance.

Then a next step S407 converts the viewpoint position 503 into a coordinate representation in the virtual three-dimensional space to be displayed, based on the reference projection plane position 703 and the reference view field direction 702 determined in the foregoing steps S405 and S406, and takes such representation as the original point 704 of projection. This conversion will be self obvious as the viewpoint position 503 is represented by the coordinate relative to the image plane of the image display device, which in turn corresponds to the projection plane.

Figure 7:
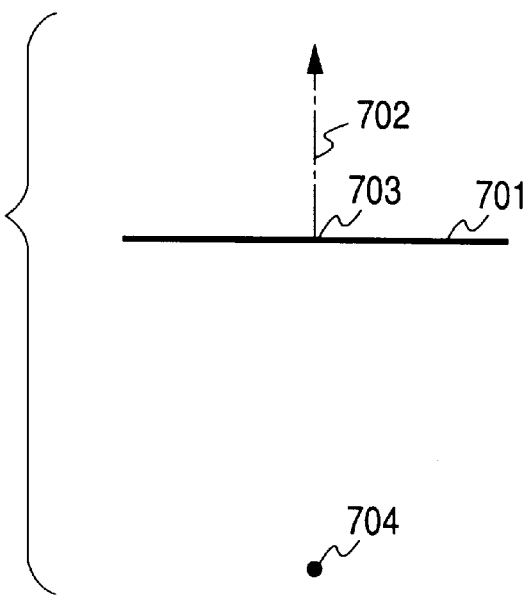
FIG. 7 is a view showing the projection plane and the direction of view line in the embodiment 1 of the present invention.

FIG. 7 shows the positional relationship among the reference projection plane position 703, the reference view field direction 702 and the projection original point 704 determined in the foregoing steps S405, S406 and S407.

Figure 8:
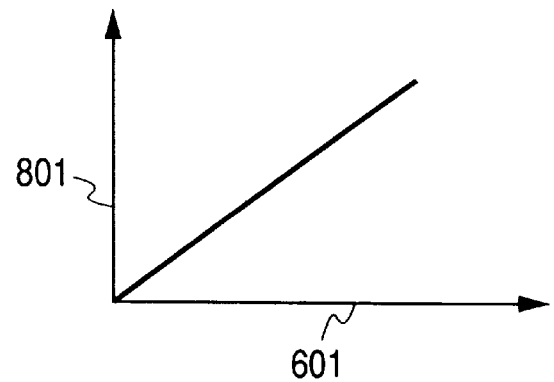
FIG. 8 is a chart showing the calculation of the deviation angle of the view line in the embodiment 1 of the present invention.

A next step S408 calculates the view field deviation angle 801 for each of the horizontal and vertical directions, utilizing a monotone increasing function as shown in FIG. 8 and containing, as variables, the view line deviation angle 601 in the horizontal and vertical directions calculated in the step S404. The monotone increasing function need not be a linear function. Also the inclination of the monotone increasing function may be adjusted arbitrarily.

Figure 9:
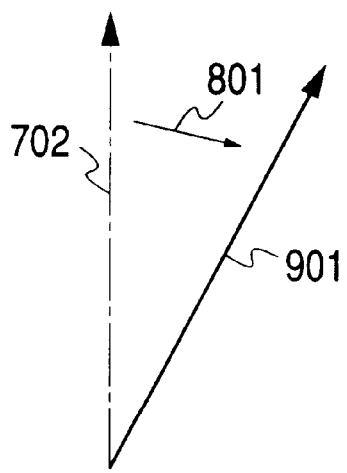
FIG. 9 is a view showing the displacement of the view line in the embodiment 1 of the present invention.

Then a step S409 determines a vector of the view field direction 901, by displacing the vector of the reference view field direction 702 determined in the step S406 according to the view field deviation angle 601 determined in the step S408, as shown in FIG. 9. The displacement of the direction vector is achieved by applying the horizontal and vertical components of the view field deviation angle to the respective components of the direction vector to be displaced.

Figure 10:
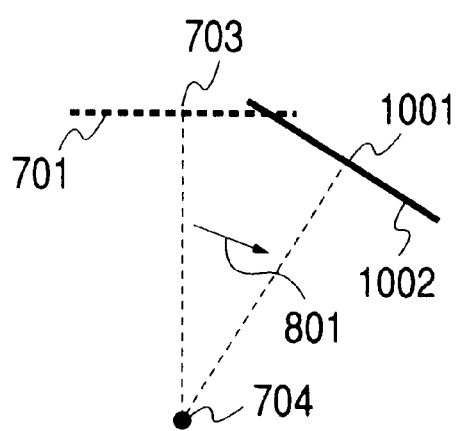
FIG. 10 is a view showing the rotation of the projection plane.

A next step S410 rotates the center position of the projection plane by the view field deviation angle 601 determined in the step S408, about the projection original point 704, as shown in FIG. 10. The steps S409 and S410 rotate the position and the direction of the projection plane, about the projection original point 704.

Then a step S411 generates an image projected on the projection plane 1002, subjected to geometric conversion, based on the perspective projection method utilizing, as parameters, the position of the projection plane and the view field direction determined in the steps S409 and S410 and the position of the projection original point determined in the step S407. The image generation may be made with any known method such as ray tracing method or scan line algorithm. The generated image data are accumulated in the frame buffer 102.

Figures 11, 12:
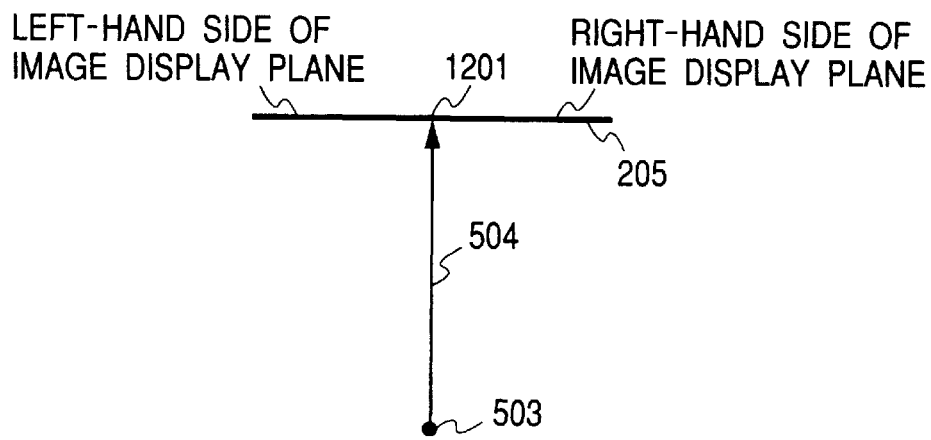
FIG. 11 is a view showing an example of the content of the pattern data.
FIG. 12 is a view showing a state in which the direction of the view line is approximately perpendicular to the image display plane of the display device.

The three-dimensional pattern data are stored in the memory device 104, in a format as shown in FIG. 11. The items of the pattern data in the pattern data list consist of an identification number of the pattern data, the kind of the pattern, the pattern data themselves etc.

Then an observation cursor sketch step in a next step S412 draws an observation point cursor, indicating the observation point, in superposed manner at the observation point 1201 which is the crossing point of the view line direction 504 with the image display plane 205. Such cursor is composed of a small pattern or a small character, having a color and a shape easily distinguishable from the background. In the present embodiment 1, the observation point cursor consists of a yellow cross.

A next step S413 executes an image display process for displaying the image, accumulated in the frame buffer 102, on the image display device 101.

Finally a step S414 discriminates whether an instruction for terminating the image generation/display process has been entered from the operator, and, if not, the process is repeated from the step S401, but, if entered, the process is terminated.

The process explained in the foregoing provides the image explained in the following.

In the following there will be explained a case of generating and displaying the image corresponding to the shape data of a room in Japanese style.

Figure 13:
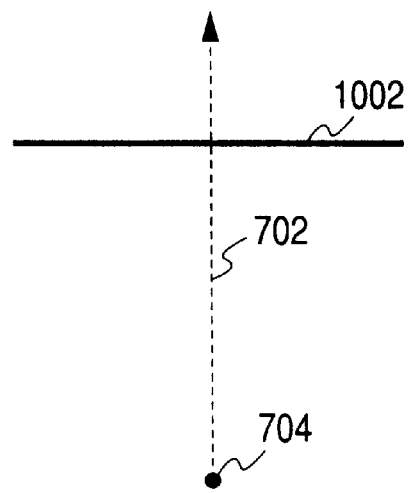
FIG. 13 is a view showing the direction of the view field in a state where the direction of the view line is approximately perpendicular to the image display plane of the display device.
Figure 14:
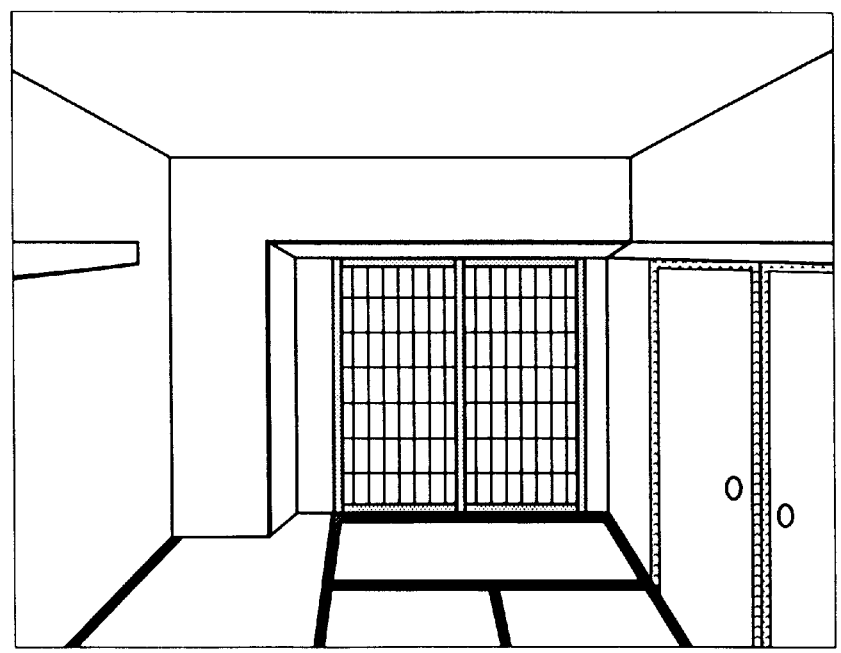
FIG. 14 is a view showing an image generated in a state where the direction of the view line is approximately perpendicular to the image display plane of the display device.

When the view line of the operator is substantially perpendicular to the image display plane of the image display device as shown in FIG. 12, the direction of the projection plane substantially coincides with the reference view field direction 702 as shown in FIG. 13. FIG. 14 shows the image obtained in such state.

Figure 15:
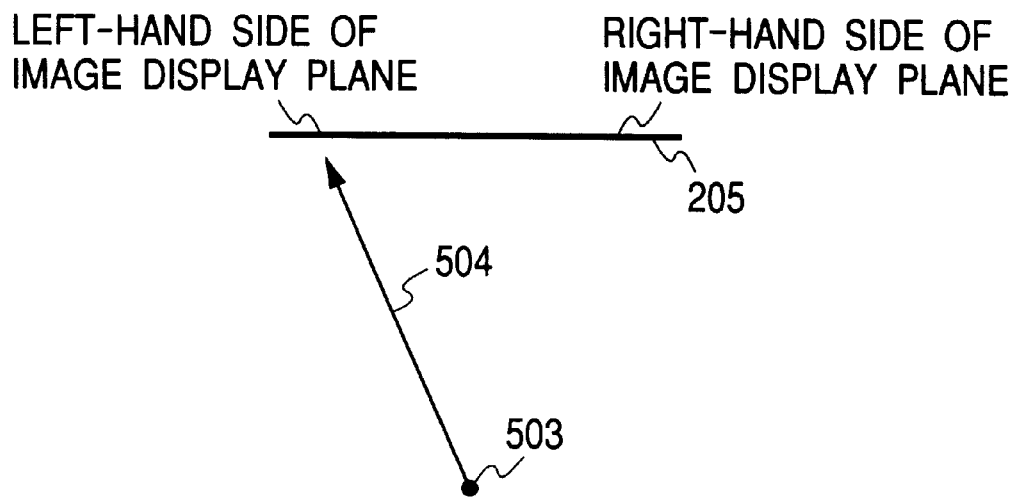
FIG. 15 is a view showing a state in which the direction of the view line is directed to the left-hand side of the image display plane of the display device.
Figure 16:
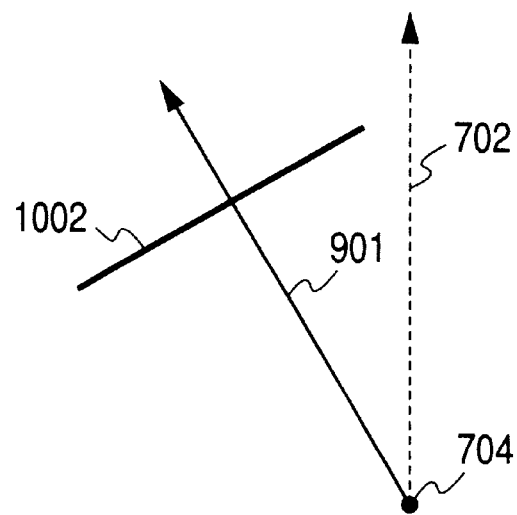
FIG. 16 is a view showing the direction of the view field in a state in which the direction of the view line is directed to the left-hand side of the image display plane of the display device.
Figure 17:
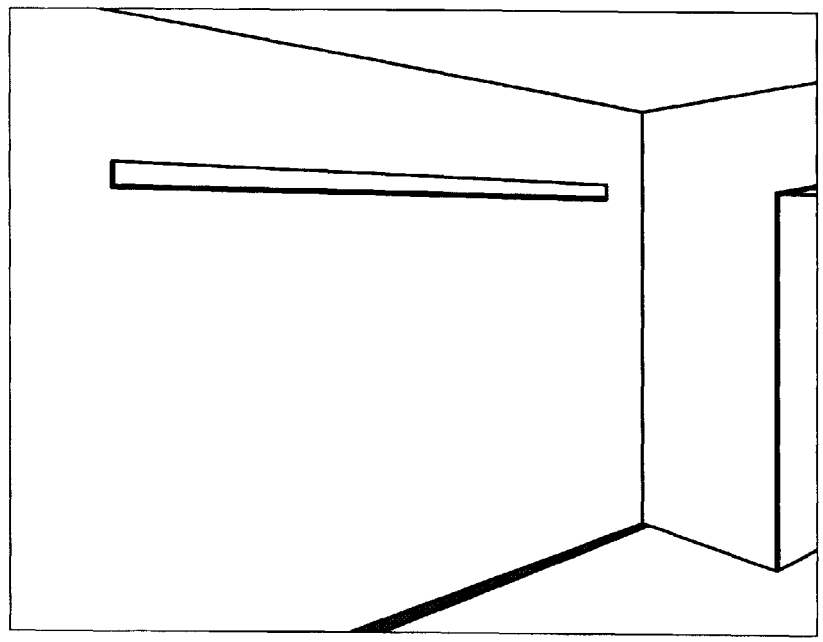
FIG. 17 is a view showing an image generated in a state in which the direction of the view line is directed to the left-hand side of the image display plane of the display device.

If the view line of the operator is moved to the left-hand side of the image display plane as shown in FIG. 15, the direction of the displayed view field also correspondingly moves to the left as shown in FIG. 16. As a result, there is obtained an image as shown in FIG. 17.

Figure 18:
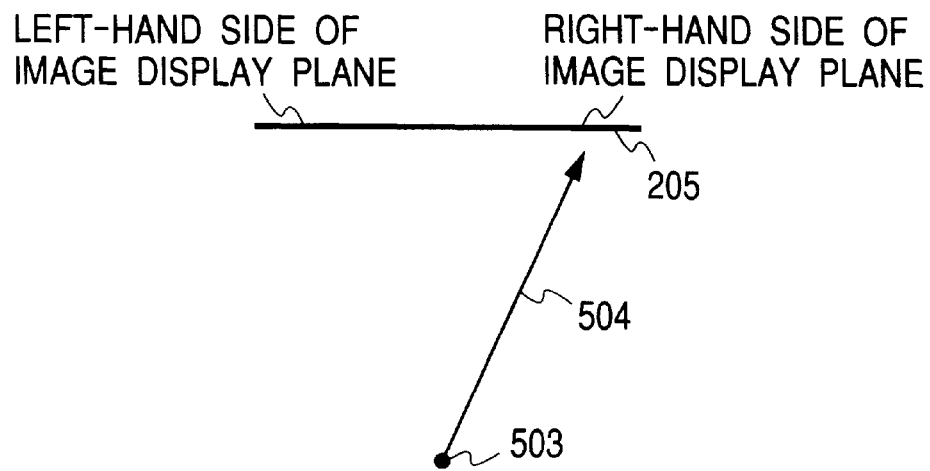
FIG. 18 is a view showing a state in which the direction of the view line is directed to the right-hand side of the image display plane of the display device.
Figure 19:
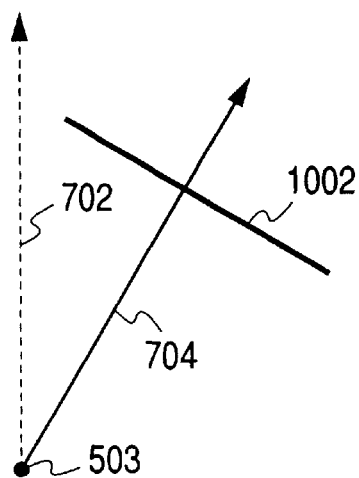
FIG. 19 is a view showing the direction of the view field in a state in which the direction of the view line is directed to the right-hand side of the image display plane of the display device.
Figure 20:
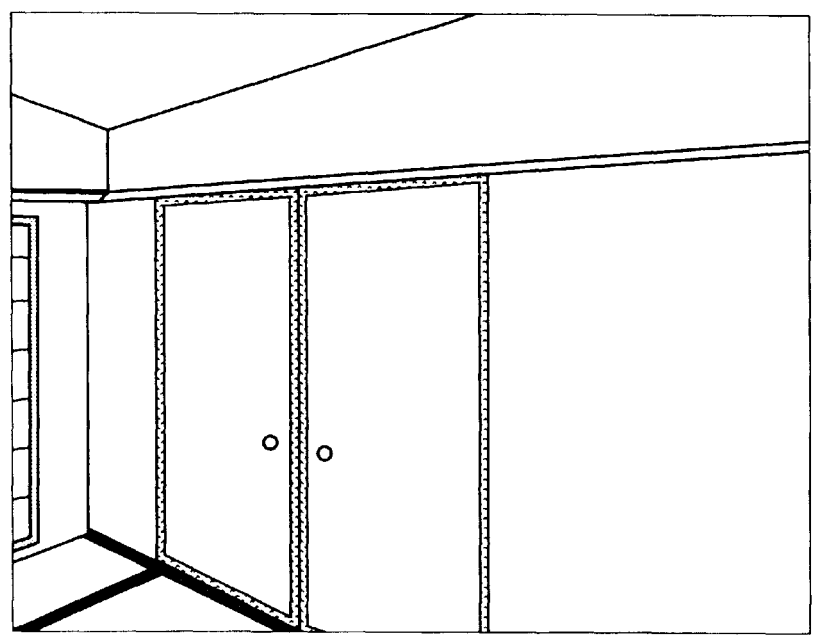
FIG. 20 is a view showing an image generated in a state in which the direction of the view line is directed to the right-hand side of the image display plane of the display device.

Then, if the view line of the operator is moved to the right-hand side of the image display plane as shown in FIG. 18, the direction of the displayed view field also correspondingly moves to the right as shown in FIG. 19. As a result, there is obtained an image as shown in FIG. 20.

Thus, by detecting the view line direction and varying the view field direction in linkage with and according to the movement of the view line direction, the direction of the displayed view field can be displaced vertically and horizontally, and the operator is only required to move the view line in vertical and horizontal directions, without any manipulation of the interactive input device with the hands of the operator.

The operability of the apparatus can therefore be improved, as the view field direction can be arbitrarily moved merely by the movement of the view line, matching the instinctive action of the operator. The operability can be improved further as the manually operated input device can be dispensed with for the movement of the view line.

(b) Second Embodiment

Figure 21:
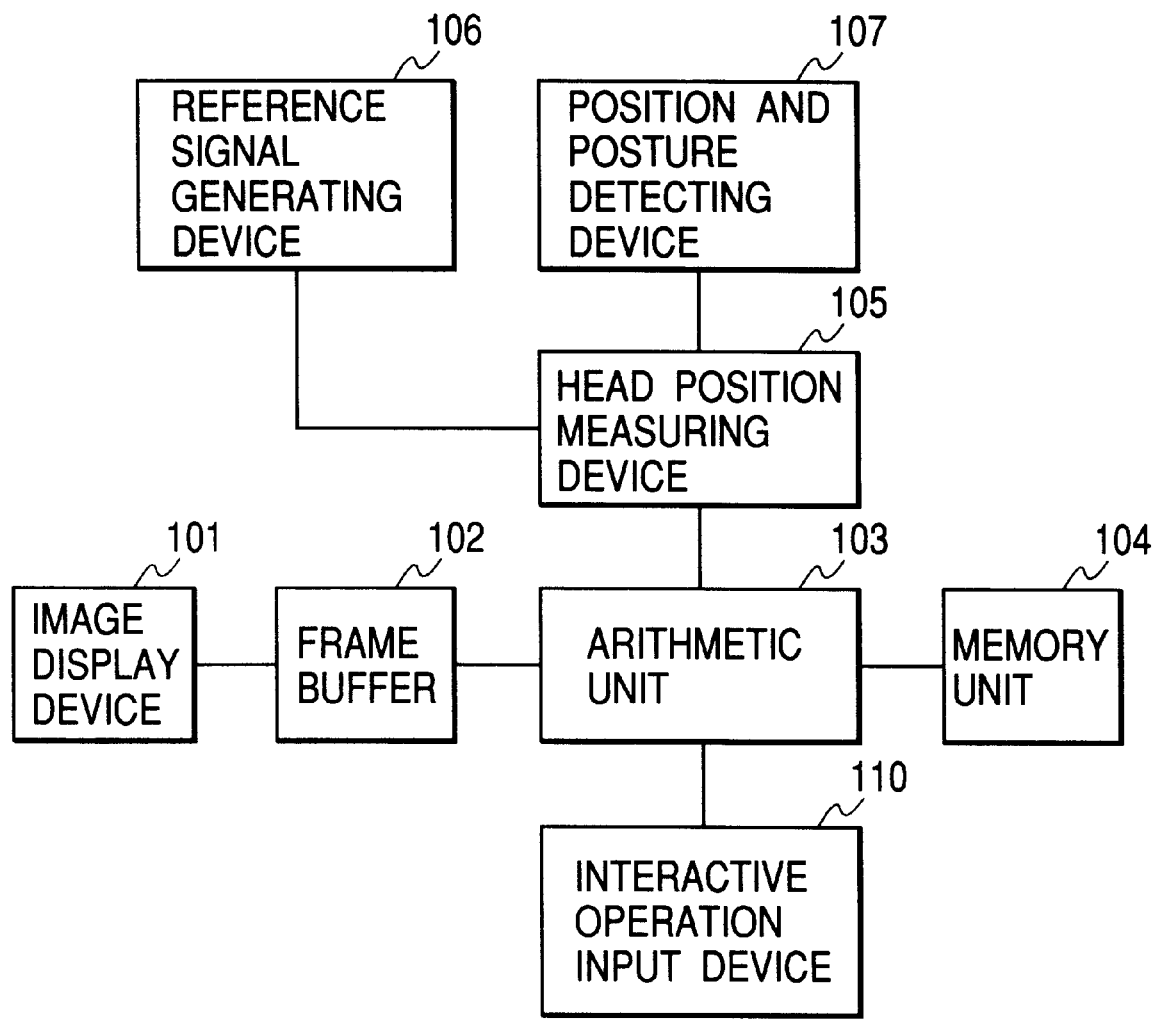
FIG. 21 is a block diagram showing the basic configuration of an embodiment 2 of the present invention.

FIG. 21 shows the basic configuration of an embodiment 2 of the present invention. The basic configuration of the embodiment 2 is obtained by eliminating, from that of the embodiment 1, the eyeball movement detecting device 109 and the view line direction measuring device 108.

Figure 22:
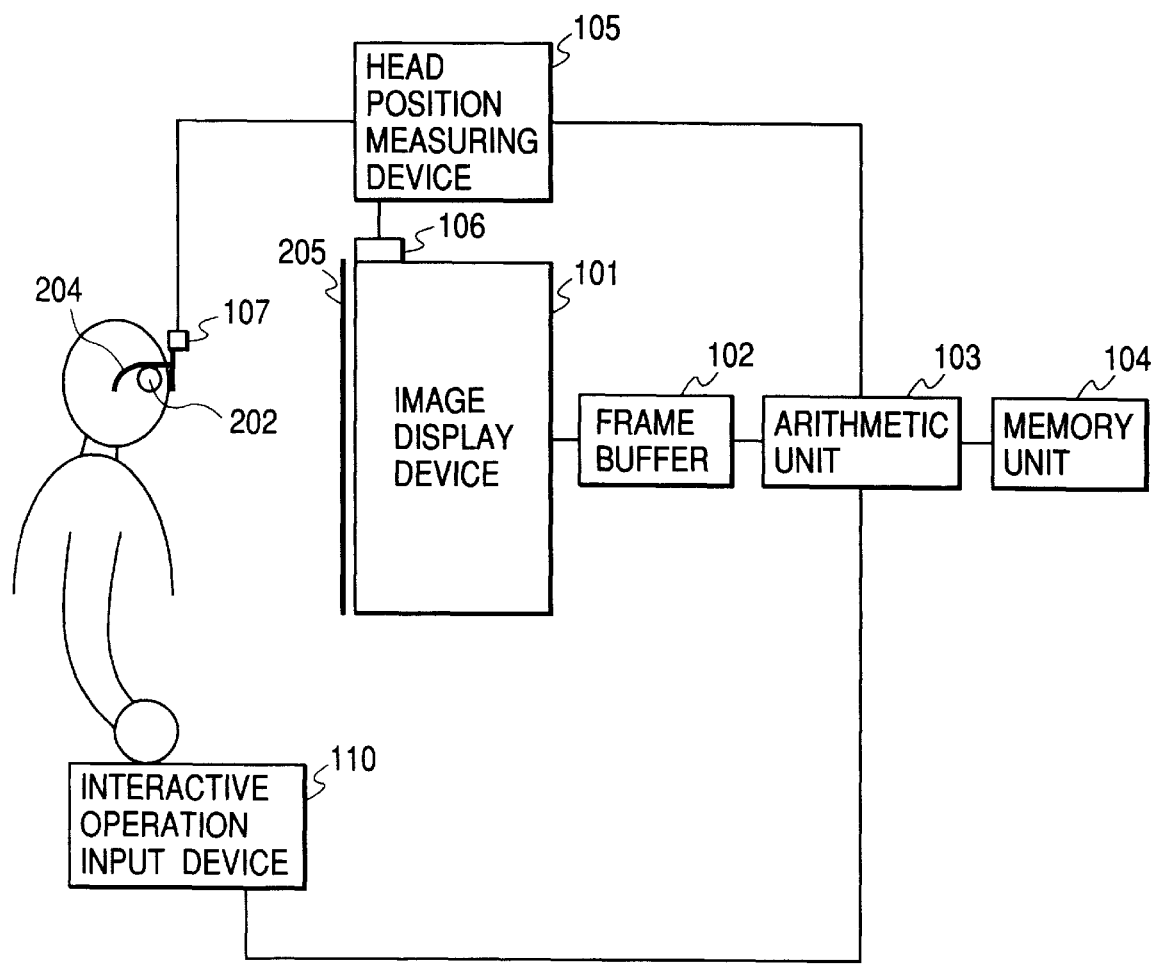
FIG. 22 is a view showing the schematic arrangement of detecting devices of the embodiment 2 of the present invention.

FIG. 22 shows the schematic arrangement of the devices of the present embodiment 2. In comparison with the arrangement of the detecting devices in the embodiment 1, the embodiment 2 lacks the eyeball movement detecting device 109 and the view line direction measuring device 108 in the detecting device support member 204.

The flowchart representing the flow of the image generation/display process in the present embodiment 2 is also represented in FIGS. 4A and 4B, as in the embodiment 1, and the details of the processes in all the steps are same, except for the step S403, as those in the embodiment 1.

As the present embodiment 2 does not measure the actual view line direction, the step S403 utilizes the posture of the head determined in the step S401. It is assumed that the operator observes a direction which is in straight front of the head, and such direction in straight front of the head is used as the direction of the view line.

Thus the direction of the displayed view field can be moved vertically and horizontally in response to corresponding vertical and horizontal movements of the straight front direction of the head of the operator, instead of the movement of the view line thereof, whereby achieved is an effect similar to that in the embodiment 1.

(c) Third Embodiment

Figure 23:
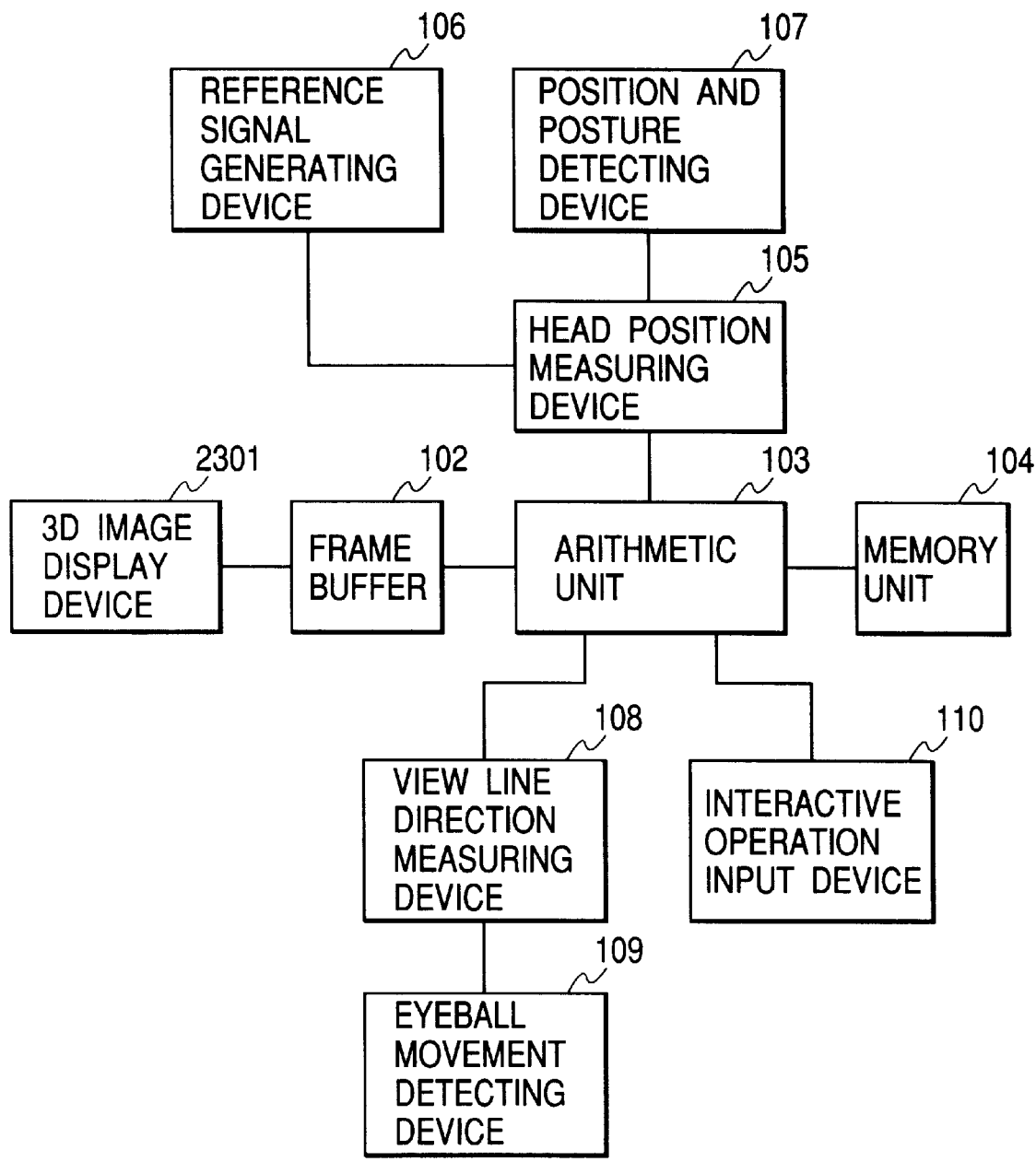
FIG. 23 is a block diagram showing the basic configuration of an embodiment 3 of the present invention.

FIG. 23 shows the basic configuration of an embodiment 3 of the present invention. The basic configuration of the embodiment 3 is obtained by replacing, in that of the embodiment 1, the image display device 101 with a 3D image display device 2301.

The 3D image display device 2301, for showing a 3D image to the operator, is composed of a CRT or an LCD provided with a 3D display mechanism. The 3D display may be based on the lenticular system, the time-shared display system by circularly polarized light or the time-shared display system with liquid crystal shutters.

Figure 24:
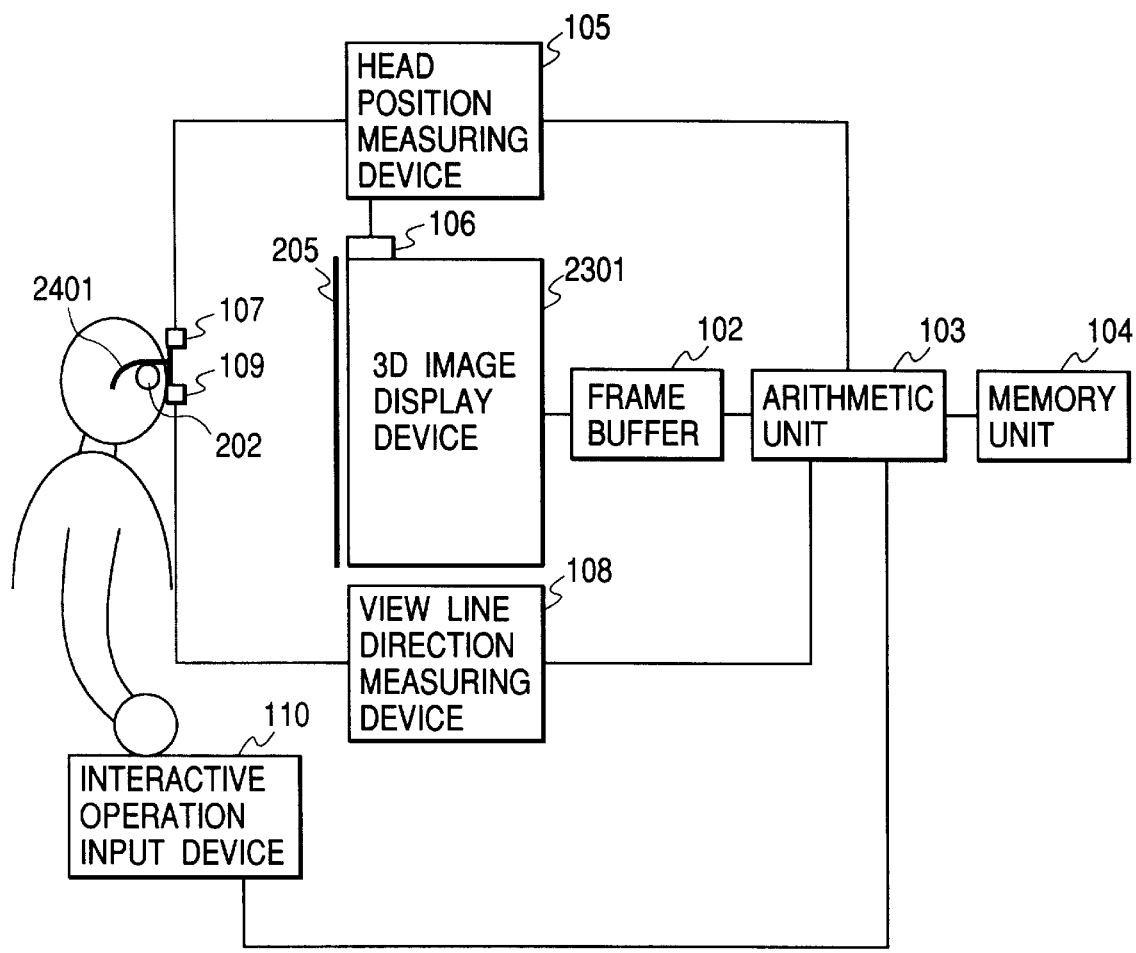
FIG. 24 is a view showing the schematic arrangement of detecting devices of the embodiment 3 of the present invention.

FIG. 24 shows the schematic arrangement of the devices of the present embodiment 3. The arrangement of the detecting devices in the embodiment 3 is obtained, in that of the embodiment 1, by replacing the image display device 101 with the 3D image display device 2301 and the detecting device support member 204 with a detecting device support member 2401 which serves also as 3D observation spectacles provided with a mechanism for stereoscopic observation of the image provided by the 3D image display device 2301. Such mechanism for stereoscopic observation depends on the kind of the 3D image display device 2301 selected for the apparatus. However, the support member 2401 is not provided with the stereoscopic observation mechanism in case of the lenticular system.

Figure 25:
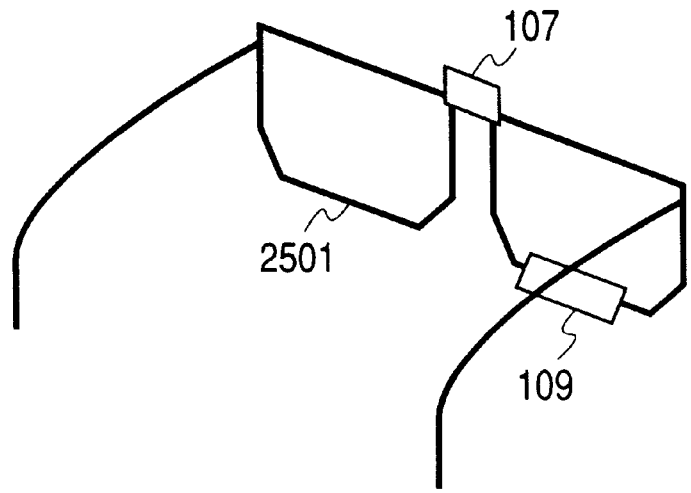
FIG. 25 is a view showing a support member for the detecting devices, serving also as stereoscopic glasses, of the embodiment 3 of the present invention.
Figure 26:
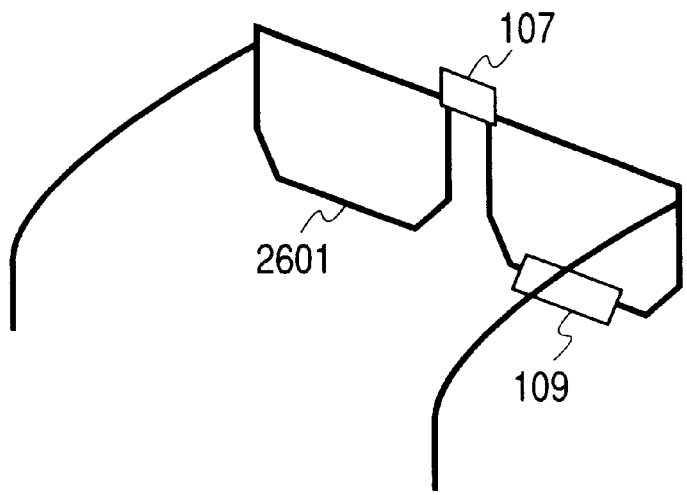
FIG. 26 is a view showing another example of the support member for the detecting devices, serving also as stereoscopic glasses, of the embodiment 3 of the present invention.

The detecting device support member 2401 serving also as the 3D observation spectacles may utilize, for example, stereoscopic observation spectacles 2501 with liquid crystal shutters as shown in FIG. 25 or those 2601 with polarization filters as shown in FIG. 26.

The flowchart representing the flow of the image generation/display process in the present embodiment 3 is also represented in FIGS. 4A and 4B, as in the embodiment 1, except that the step S411 generates two images in consideration of the parallax of the left and right eyes, instead of a single image in the embodiment 1.

In this manner, the present invention is applicable also to an image display apparatus which generates and displays a 3D image.

As explained in the foregoing, the embodiments 1 to 3 of the present invention allow to move the direction of the view field to be displayed in the virtual three-dimensional space in response to the movement of the direction of the view line of the operator, thereby dispensing with the manual control of the view field direction by the operator and also providing advantages of reducing the errors in the operation and improving the operability of the apparatus, by an instinct-matching operation that the direction of the view field in the three-dimensional space is moved in the direction of movement of the view line of the operator.

(d) Fourth Embodiment

In a view line information input apparatus of the embodiment 4, the position and the posture of the head of the operator are determined by the data from a position and posture detecting device mounted on the head of the operator. Also a distance vector from the center of measurement of the head position and posture measuring device to the optical center of the eyeball is measured in advance, and the measured position vector and the above-mentioned distance vector are synthesized to determine the optical center of the eyeball, namely the position of the viewpoint. Also the head posture and the viewpoint position mentioned above are converted into geometrical representation based on the image display plane of the image display device.

At first the amount of rotation of the eyeball is measured by an eyeball movement measuring device. Such amount of rotation does not necessarily represent the correct angle of rotation, because of the personal fluctuation in the shape of the eyeball and in the state of mounting of the device, but is merely considered as a value approximately proportional to the rotation angle. The following calibrating operation is executed in order to convert such amount of rotation into a correct rotation angle.

Utilizing the viewpoint position and the heat posture determined as explained above, there is displayed a right direction reference index on the image display plane, in a position on a horizontal plane passing through the viewpoint position and in a direction rotated, about the viewpoint position, to the right by a specified angle from the straight front direction of the head. Then the rotation amount of the eyeball, measured by the eyeball movement measuring device when the operator watches the right direction reference index, is registered as a right reference rotation amount.

Then displayed is a left direction reference index on the image display plane, in a position on a horizontal plane passing through the viewpoint position and in a direction rotated, about the viewpoint position, to the left by a specified angle from the straight front direction of the head. Then the rotation amount of the eyeball, measured by the eyeball movement measuring device when the operator watches the left direction reference index, is registered as a left reference rotation amount.

Then the ratio of the difference between the right and left reference rotation amounts to the difference between the right and left reference angles is set as a first correcting parameter or "correction coefficient".

Then a value obtained by subtracting the product of the above-mentioned correction coefficient and the right reference rotation amount from the right reference angle is set as a second correcting parameter or "zero point offset".

After the determination of the two correcting parameters, i.e. the "correction coefficient" and the "zero point offset", the rotation amount obtained from the eyeball movement measuring device is multiplied by the correction coefficient and the zero point offset is added to the obtained result.

In this manner, the rotation amount in the unknown unit is converted into a value in the unit of degrees, representing the rotation angle from the front direction of the head. This rotation angle is used for calculating a local view line direction vector, taking the head posture as reference.

Then a coordinate transformation describing the head posture is applied to the local view line direction vector, thereby calculating a view line vector based on the image display plane. This view line direction vector and the viewpoint position vector mentioned above are the target information to be obtained by the view line information input apparatus of the present embodiment.

The view line information input apparatus of the present embodiment may further execute, by the same central processing unit, any information processing utilizing the view line direction vector and the viewpoint position vector obtained in the above-explained manner.

In the following the function of the view line information input apparatus of the present embodiment 4 will be explained in detail, with reference to the attached drawings.

Figure 27:
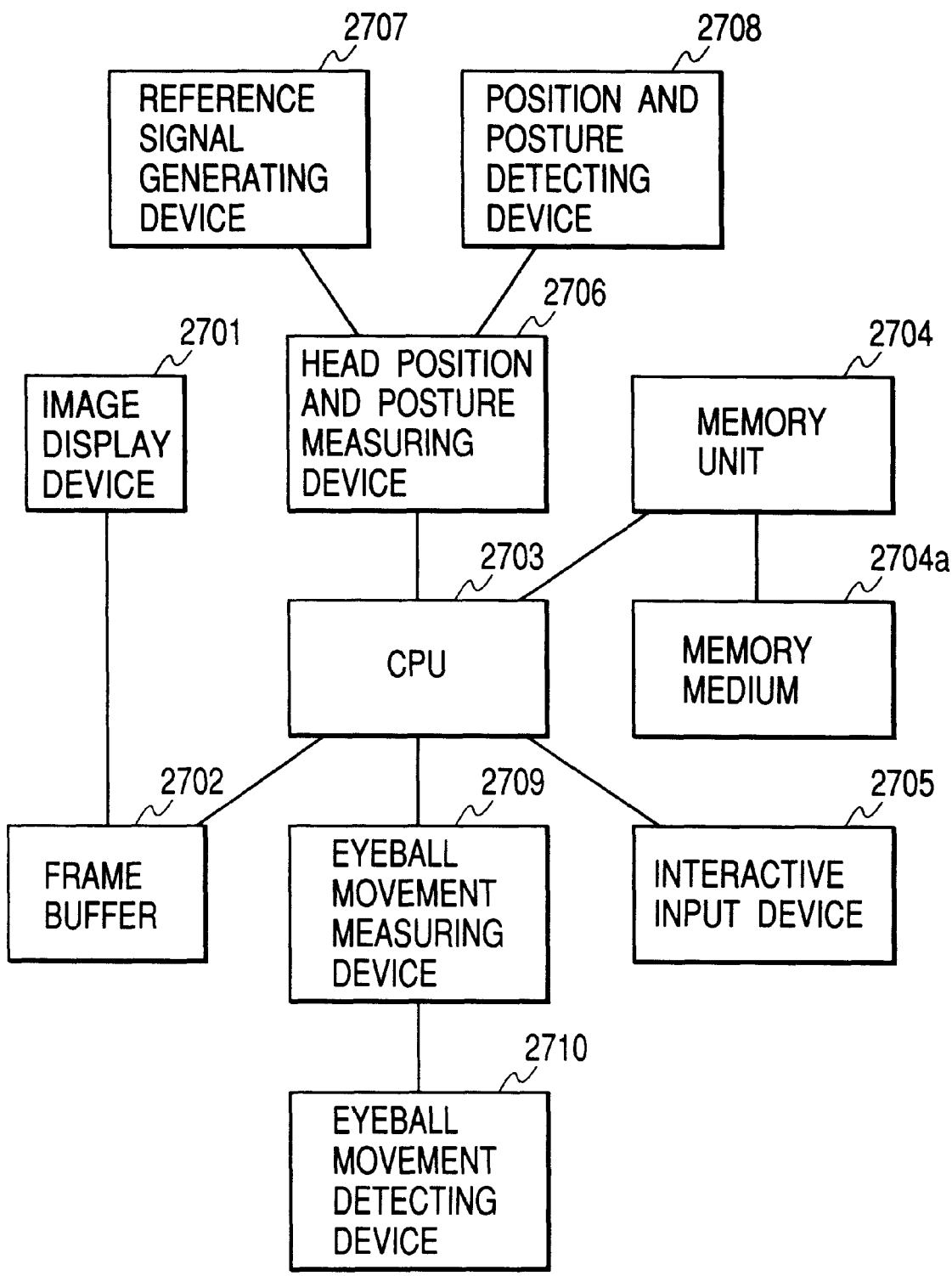
FIG. 27 is a block diagram showing the basic configuration of an embodiment 4 of the present invention.

FIG. 27 is a block diagram showing the basic configuration of the view line information input apparatus of the embodiment 4. Referring to FIG. 27, an image display device 2701, for presenting an arbitrary pattern, image or character to the operator, is composed for example of a CRT, an LCD, a PDP, an EL display or a fluorescent tube display.

A frame buffer 2702 stores the image data to be displayed on the image display device 2701.

A central processing unit 2703 executes a correcting operation and processes relating to the generation of the view line information, according to a procedure stored in a memory unit 2704, and also controls various devices. It also generates the image data to be displayed on the image display device 2701 and stores the image data in the frame buffer 2702. The central processing unit 2703 may also execute any other processes utilizing the view line information.

A memory unit 2704 stores, in a memory medium 2704a, the procedure of processing of the central processing unit 2703 and information required for such processing, and is also used as a memory area for the calculation required in the processing of the central processing unit 2703. The memory medium 2704a stores a control program represented in FIGS. 29A and 29B and data required in other processes.

An interactive input device 2705, to be used by the operator for entering instructions for controlling the flow of the control program represented by the flowcharts in FIGS. 29A and 29B, is composed for example of a mouse, a keyboard or switches.

A head position and posture measuring device 2706 analyzes the signal from a position and posture detecting device 2708 and enters the information on the position and posture of the head of the operator, based on a reference signal generation device 2707, into the central processing unit 2703.

A reference signal generation device 2707 generates a signal to be used as a reference in the position and posture detecting device 2708.

A position and posture detecting device 2708 detects the position and the posture of the head.

An eyeball movement measuring device 2709 analyzes a signal from an eyeball movement detecting device 2710 and supplies the central processing unit 2703 with rotation amount information proportional to the rotation angle of the eyeball.

An eyeball movement detecting device 2710 detects information for measuring the rotational movement of the eyeball of the operator, and is composed of a point light source illuminating the surface of the cornea and an image sensor for receiving the image of the eyeball. It may also be composed of electrodes and a voltmeter for measuring the potential of an eye muscle.

Figure 28:
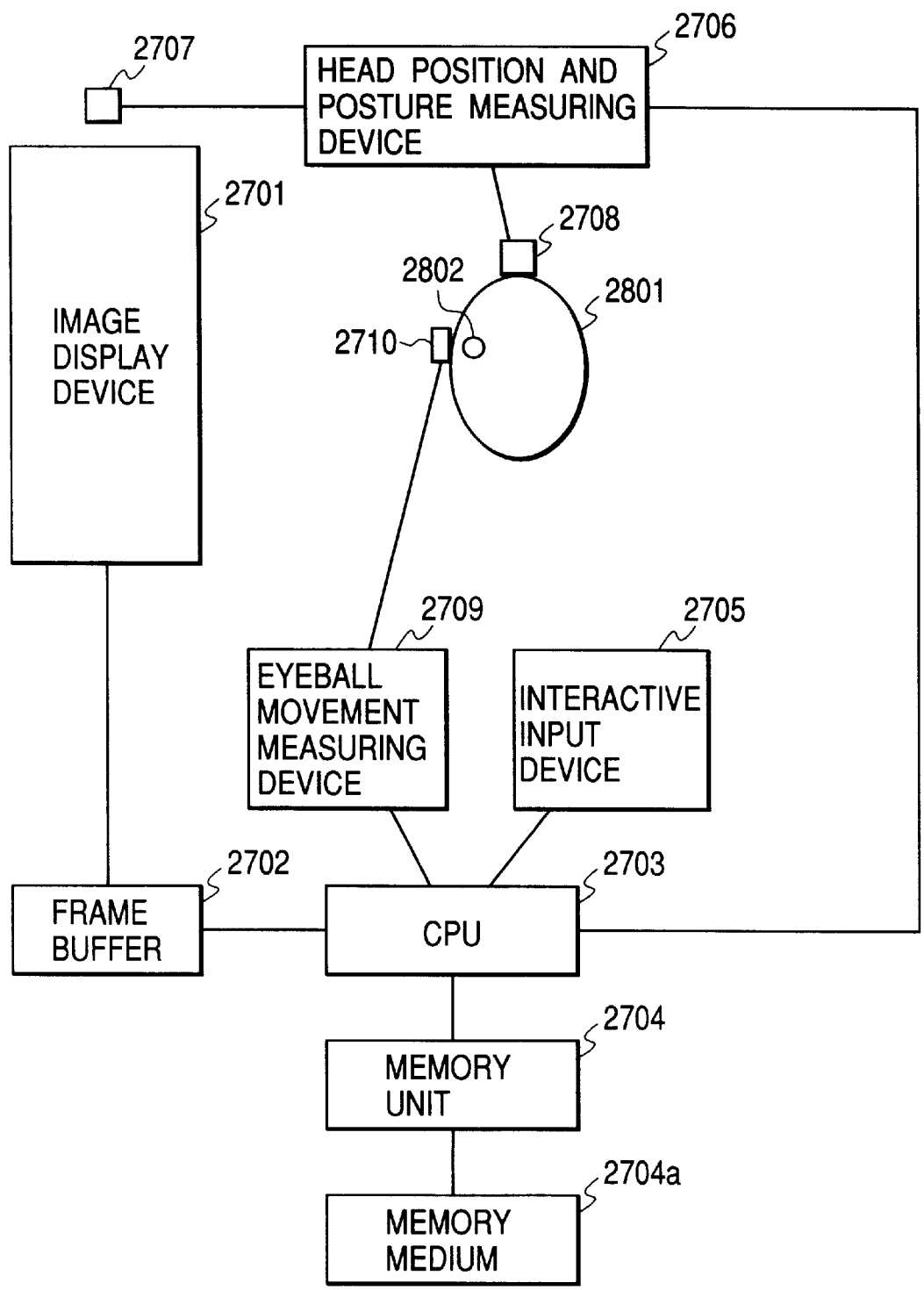
FIG. 28 is a view showing the schematic arrangement of detecting devices of the embodiment 4 of the present invention.
Figure 30:
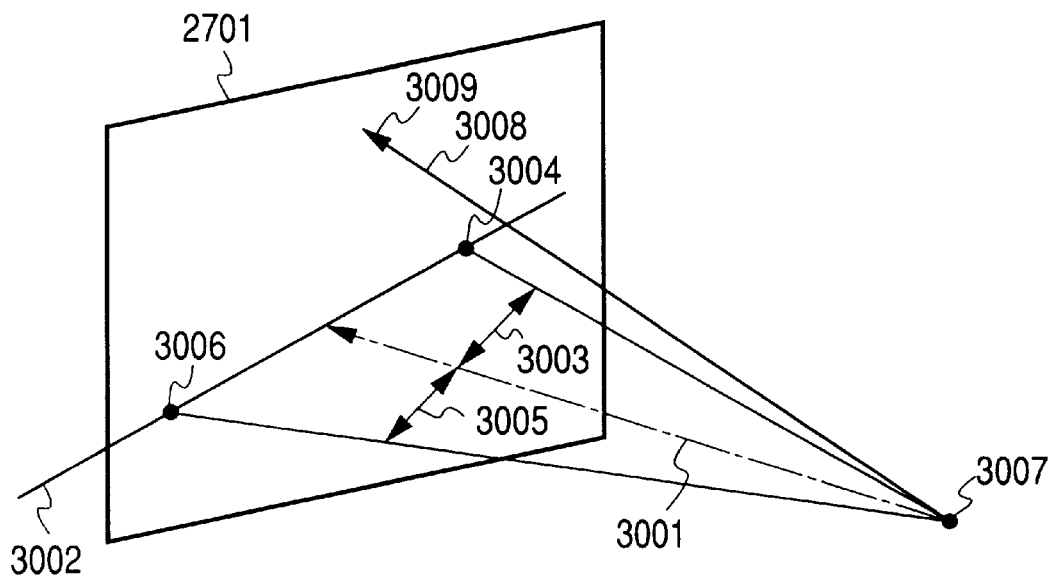
FIG. 30 is a view showing the positional relationship among the viewpoint and the view line of the operator and the image display plane in the embodiment 4 of the present invention.

FIG. 28 is a view showing the schematic arrangement of the devices constituting the views line information input apparatus of the present embodiment 4.

Referring to FIG. 28, the reference signal generating device 2707 is fixed on the image display device 2701. The reference signal generating device 2707 may also be provided by another method capable of fixing the relative position with respect to the image display device 2701. For example, the reference signal generating device 2707 may be fixed on a support member on which the image display device 2701 is fixed. Otherwise, the reference signal generating device 2707 may be fixed on a support member placed a floor, on which placed is a support member fixedly supporting the image display device 2701.

The position and posture detecting device 2708 and the eyeball movement detecting device 2710 are fixed, by a support member of spectacle frame shape, on the head 2801 of the operator. The eyeball movement detecting device 2710 is mounted in front of the eyeball of the eyeball 2802 of the operator. The support member may also be provided with a mechanism for separating the left and right images, for achieving stereoscopic observation of the image display device 2701, such as circularly polarizing filters or liquid crystal shutter mechanisms. Other devices may be provided in suitable arbitrary positions.

FIGS. 29A and 29B are flowcharts showing the flow of the view line information input process in the present embodiment 4. Now the details of the process will be step by step explained in the following.

At first, as preparation prior to the start of the process, three sets of parameters are actually measured and stored in the memory unit 2704 in advance.

Among these parameters of three sets, the first one is a coordinate transformation, representing the relative posture of the head 2801 of the operator, based on the position and posture detecting device 2708. The second parameter is a distance vector from the center of measurement of the position and posture detecting device 2708 to the optical center of the eyeball, measured by the information from the position and posture detecting device 2708. The third parameter is a coordinate transformation representing the relative posture of the reference signal generating device 2707, based on the image plane of the image display device 2701.

In a first step S2901, the head position and posture measuring device 2706 measures the position and the posture of the position and posture detecting device 2708, based on the coordinate system of the reference signal generating device 2707.

Then the coordinate transformation, constituting the pre-measured first parameter, is synthesized with the measured posture of the position and posture detecting device 2708 to determine the posture of the head, based on the reference signal generating device 2707. Then the coordinate transformation constituting the above-mentioned pre-measured third parameter is applied to thus determined head posture to determine the posture of the head, based on the image plane of the image display device 2701.

Then a step S2902 synthesizes the position vector of the position and posture detecting device 2708, measured in the step S2901 based on the coordinate system of the reference signal generating device 2707, with the distance vector constituting the above-mentioned pre-measured second parameter, thereby determining the optical center of the eyeball based on the coordinate system of the reference signal generating device 2707, namely the viewpoint position. This position is further subjected to the coordinate transformation constituting the aforementioned pre-measured third parameter to determine the viewpoint position 3007, based on the image plane of the image display device 2701.

A next step S2903 analyzes the signal from the eyeball movement detecting device 2710 by the eyeball movement measuring device 2709, thereby measuring the rotation amount of the eyeball. In general, the rotation amount of the eyeball measured by the eyeball movement measuring device 2709 does not necessary represent the correct rotation angle, because of the personal fluctuation in the shape of the eyeball and in the state of mounting, but is approximately linearly related with the rotation angle. Consequently it has to be corrected to the correct rotation angle.

A parameter required for this purpose is called "correcting parameter", and an operation of setting the correcting parameter is called "calibrating operation". The correcting parameter will be explained in more details later. The calculation of the correcting parameters requires two additional parameters, namely a "right reference rotation amount" and a "left reference rotation amount", which will also be explained later.

A next step S2904 discriminates whether a calibrating operation is required, and, if not, the sequence jumps to a step S2914, but, if required, the sequence proceeds to a step S2905.

A step S2905 discriminates whether the sequence branches to a process for registering the right reference rotation amount, according to whether a distinctive instruction is given therefor by the operator through the interactive input device 2705. The sequence proceeds to a step S2906 in case such process for registering the right reference rotation amount is to be executed, but it proceeds to a step S2909 in case such process is not to be executed.

A step S2906 displays a marker index, namely a right direction reference index 3004, in a position on the image display device 2701 and at a direction which is in a plane passing through the viewpoint position 3007 determined in the step S2902 and defined by the head front direction 3001 and the head horizontal direction 3002 determined in the step S2901 and which is rotated, from the head front direction 3001, to the right by a predetermined angle, namely by the right reference angle 3003 starting from the viewpoint position 3007.

A next step S2907 discriminates whether the eyeball rotation amount measured in the step S2903 is to be registered as the right reference rotation amount. The conditions for this discrimination are that the operator watches the right direction reference index 3004 displayed in the step S2906 and that a distinctive instruction is given by the operator through the interactive input device 2705.

A next step S2908 registers, as the right reference rotation amount, the eyeball rotation amount when the operator watches the right direction reference index 3004 displayed on the image display device 2701 in the step S2906, Then the sequence proceeds to a step S2909.

A step S2909 discriminates whether the sequence branches to a process for registering the left reference rotation amount, according to whether a distinctive instruction is given therefor by the operator through the interactive input device 2705.

A step S2910 displays a marker index, namely a left direction reference index 3006, in a position on the image display device 2701 and at a direction which is in a plane passing through the viewpoint position 3007 determined in the step S2902 and defined by the head front direction 3001 and the head horizontal direction 3002 determined in the step S2901 and which is rotated, from the head front direction 3001, to the right by a predetermined angle, namely by the left reference angle 3005 starting from the viewpoint position 3007.

A next step S2911 discriminates whether the eyeball rotation amount measured in the step S2903 is to be registered as the left reference rotation amount. The conditions for this discrimination are that the operator watches the left direction reference index 3006 displayed in the step S2910 and that a distinctive instruction is given by the operator through the interactive input device 2705.

A next step S2912 registers, as the left reference rotation amount, the eyeball rotation amount when the operator watches the left direction reference index 3006 displayed on the image display device 2701 in the step S2910.

A next step S2913 calculates the correcting parameters, utilizing the right reference rotation amount registered in the step S2908 and the left reference rotation amount registered in the step S2912. The correcting parameters include the "correction coefficient" and the "zero point offset". The "correction coefficient" is obtained by dividing the difference of the right and left reference rotation amounts with the difference of the right reference angle 3003 and the left reference angle 3005. Also the "zero point offset" is obtained by subtracting the product of the right reference rotation amount and the correction coefficient from the reference angle 3003.

Then a step S2914 converts the eyeball rotation amount, measured by the eyeball movement measuring device 2709 in the step S2903, into an eyeball rotation angle based on the head of the operator, utilizing the two correcting parameters, namely the correction coefficient and the zero point offset, determined in the step S2913. This conversion is achieved by adding the zero point offset to the product obtained by multiplying the eyeball rotation amount with the correction coefficient.

A next step S2915 applies the coordinate transformation, constituting the aforementioned pre-measured third parameter, to the coordinate transformation representing the eyeball rotation amount determined in the step S2914, thereby calculating the view line direction vector 3008 based on the image display device 2701.

The viewpoint position vector 3007 determined in the step S2901 and the view line direction vector 3008 determined in the step S2915 are the target information desired in the view line information input apparatus of the present embodiment.

Then a step S2916 executes an arbitrary process utilizing the viewpoint position vector determined in the step S2901 and the view line direction vector determined in the step S2915. The simplest example of such process is to display, at the crossing point of the view line 3007 with the image display plane of the image display device 2701, an index mark indicating the point watched by the operator. Then a step S2917 discriminates whether the process is to be terminated, and, if not, the sequence returns to the step S2901 to repeat the process.

As explained in the foregoing, by displaying the index mark required for the calibrating operation on the image display plane of the image display device 2701, based on the position and the posture of the heat 2801 of the operator, it is rendered possible to execute the calibrating operation without fixing the head of the operator.

(e) Fifth Embodiment

Figure 31:
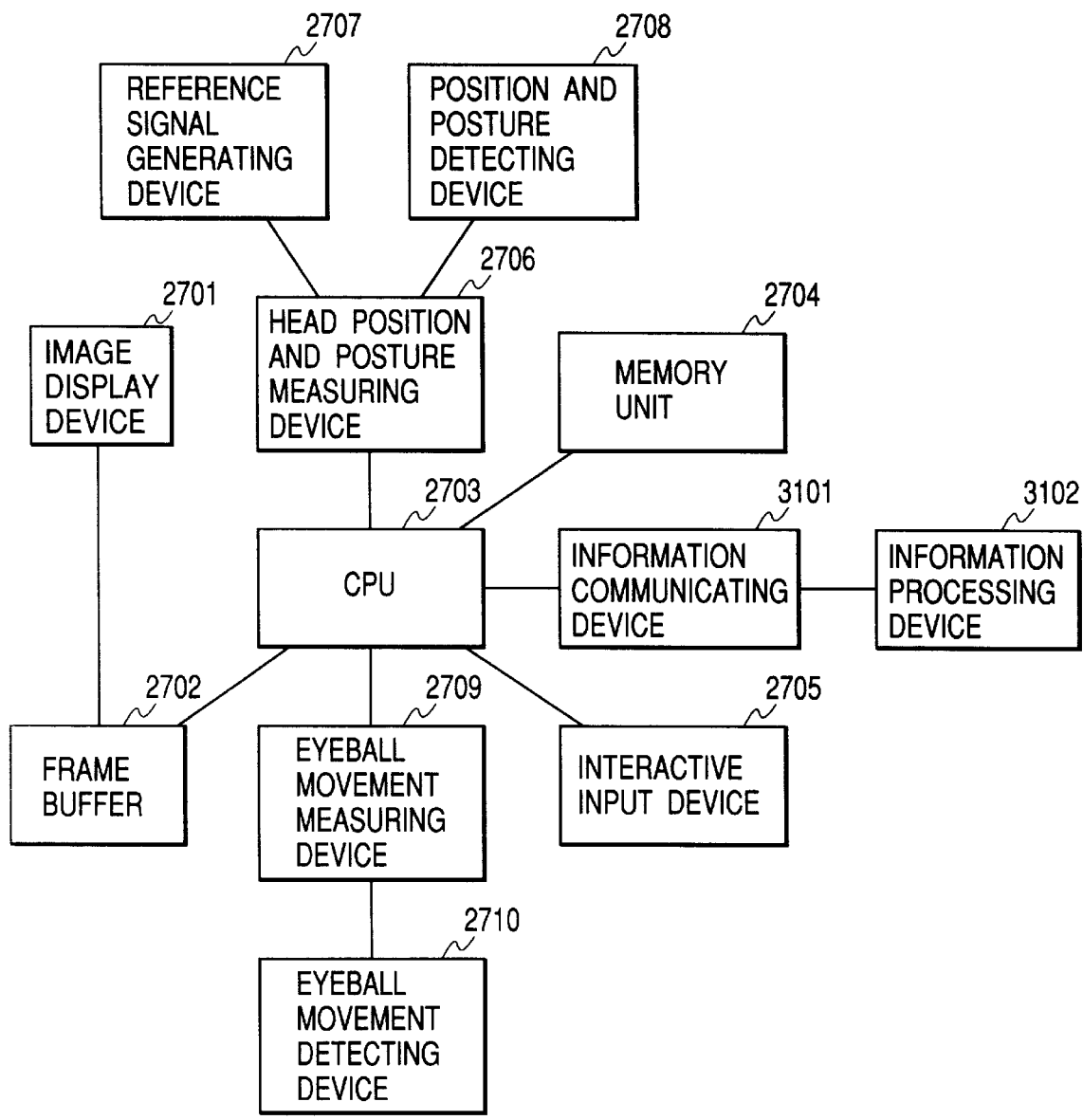
FIG. 31 is a block diagram showing the basic configuration of an embodiment 5 of the present invention.

In the following there will be explained a fifth embodiment of the present invention, of which basic configuration is obtained by adding, as shown in FIG. 31, an information communicating device 3101 and an information processing device 3102 to the basic configuration of the fourth embodiment.

The information communicating device 3101 transmits, by an arbitrary communication format such as Ethernet, RS232C, telephone line or ISDN, the view line information of the operator obtained by the fourth embodiment, namely the viewpoint position vector 3007 and the view line direction vector 3008 based on the image display device 2701, to an arbitrary information processing device 3102, which in response executes an arbitrary process, utilizing the view line information transmitted from the information communicating device 3101.

The flowchart representing the flow of the view line information input process in the present fifth embodiment is also represented by FIGS. 29A and 29B, as in the case of the fourth embodiment, and the details of all the process steps are same as those in the fourth embodiment, except however for the step S2916.

The process of the step S2916 in the fifth embodiment is approximately same as that in the fourth embodiment, but it also includes a procedure of transmitting the viewpoint position vector 3007 and the view line direction vector 3008 to the information processing device 3102 through the information communicating device 3101.

As explained in the foregoing, the fourth and fifth embodiments allow to display an index mark, necessary for the calibrating operation, in an appropriate position on the image display plane, based on the position and the posture of the head of the operator. Consequently the calibrating operation can be executed while the view line information entered from the view line information input device is utilized in another information processing device. Thus correct calibration can be conducted at any time, without causing the trouble of fixing the head of the operator.

The present invention is applicable not only to a system consisting of plural equipment but also to an apparatus consisting of a single equipment. It is naturally applicable also to a case where the present invention is executed by the supply of a program to a system or an apparatus. In such case, a memory medium storing a program relating to the present invention constitutes the present invention, and, the system or the apparatus functions in a predetermined manner by fetching such program from the memory medium into such system or apparatus.

What is claimed is:

1. An image display method comprising:

a view line direction input step of inputting the direction of the view line of an operator, watching an image display plane, as a reference direction of said image display plane;

a viewpoint position input step of inputting the position of the viewpoint of the operator, watching said image display plane, as a reference position of said image display plane;

a view line deviation angle deriving step of deriving a view line deviation angle which is formed by the central axis of said image display plane and the view line direction of the operator inputted in said view line direction input step;

a center point deriving step of deriving a center point for the projection in a virtual three-dimensional space to be displayed, based on the viewpoint position of the operator inputted in said viewpoint position input step and the center position and direction of a projection plane corresponding to said image display plane in said virtual three-dimensional space to be displayed;

a direction displacing step of displacing the direction of the projection plane, based on the view line deviation angle derived in said view line deviation angle deriving step;

an image generation step of generating an image, in the direction of the projection plane displaced by said direction displacing step, with the center at the center point derived in said center point deriving step; and an image display step of displaying the image, generated in said image generation step, on said image display plane.

2. An image display method according to claim 1, wherein said view line direction input step is adapted to input the direction of the view line of a dominant eye of the operator who watches said image display plane.

3. An image display method according to claim 1, wherein said view line direction input step is adapted to input the front direction of the head of the operator as a reference direction of said image display plane.

4. An image display method according to claim 1, wherein said view line direction input step is adapted to input the position of the viewpoint of a dominant eye of the operator who watches said image display plane.

5. An image display method according to claim 1, wherein said view line deviation angle deriving step is adapted to derive the view line deviation angle which is formed by the central axis of said image display plane and the view line direction of the operator inputted in said view line direction input step, respectively in the vertical direction and in the horizontal direction.

6. An image display method according to claim 1, wherein said direction displacing step is adapted to displace the direction of the projection plane, based on a monotone increasing function having the view line deviation angle, derived in said view line deviation angle deriving step, as a variable.

7. An image display method according to claim 1, wherein said image generation step is adapted to generate an image of a three-dimensional geometrical pattern.

8. An image display method according to claim 1, wherein said image generation step is adapted to generate an image based on the perspective projection method.

9. An image display apparatus comprising:
view line direction input means for inputting the direction of the view line of an operator, watching an image display plane, as a reference direction of said image display plane;
viewpoint position input means for inputting the position of the viewpoint of the operator, watching said image display plane, as a reference position of said image display plane;
view line deviation angle deriving means for deriving a view line deviation angle which is formed by the central axis of said image display plane and the view line direction of the operator inputted by said view line direction input means;
center point deriving means for deriving a center point for the projection in a virtual three-dimensional space to be displayed, based on the viewpoint position of the operator inputted by said viewpoint position input means and the center position and direction of a projection plane corresponding to said image display plane in said virtual three-dimensional space to be displayed;
direction displacing means for displacing the direction of the projection plane, based on the view line deviation angle derived by said view line deviation angle deriving means;
image generation means for generating an image, in the direction of the projection plane displaced by said direction displacing means, with the center at the center point derived by said center point deriving means; and
image display means for displaying the image, generated by said image generation means, on said image display plane.

10. An image display apparatus according to claim 9, wherein said view line direction input means is adapted to input the direction of the view line of a dominant eye of the operator who watches said image display plane.

11. An image display apparatus according to claim 9, wherein said view line direction input means is adapted to input the front direction of the head of the operator as a reference direction of said image display plane.

12. An image display apparatus according to claim 9, wherein said view line direction input means is adapted to input the position of the viewpoint of a dominant eye of the operator who watches said image display plane.

13. An image display method according to claim 9, wherein said view line deviation angle deriving means is adapted to derive the view line deviation angle which is formed by the central axis of said image display plane and the view line direction of the operator inputted by said view line direction input means, respectively in the vertical direction and in the horizontal direction.

14. An image display apparatus according to claim 9, wherein said direction displacing means is adapted to displace the direction of the projection plane, based on a monotone increasing function having the view line deviation angle, derived by said view line deviation angle deriving means, as a variable.

15. An image display apparatus according to claim 9, wherein said image generation means is adapted to generate an image of a three-dimensional geometrical pattern.

16. An image display apparatus according to claim 9, wherein said image generation means is adapted to generate an image based on the perspective projection method.

17. A computer readable memory medium storing a program comprising:
a view line direction input module for inputting the direction of the view line of an operator, watching an image display plane, as a reference direction of said image display plane;
a viewpoint position input module for inputting the position of the viewpoint of the operator, watching said image display plane, as a reference position of said image display plane;
a view line deviation angle deriving module for deriving a view line deviation angle which is formed by the central axis of said image display plane and the view line direction of the operator inputted by said view line direction input module;
a center point deriving module for deriving a center point for the projection in a virtual three-dimensional space to be displayed, based on the viewpoint position of the operator inputted by said viewpoint position input module and the center position and direction of a projection plane corresponding to said image display plane in said virtual three-dimensional space to be displayed;
a direction displacing module for displacing the direction of the projection plane, based on the view line deviation angle derived by said view line deviation angle deriving module;
an image generation module for generating an image, in the direction of the projection plane displaced by said direction displacing module, with the center at the center point derived by said center point deriving module; and
an image display module for displaying the image, generated by said image generation module, on said image display plane.

18. An image display method comprising:
a view line direction input step of inputting the direction of the view line of an operator, watching an image display plane, as a reference direction of said image display plane;
a view line deviation angle deriving step of deriving a view line deviation angle which is formed by the central axis of said image display plane and the view line direction of the operator inputted in said view line direction input step;
a direction displacing step of displacing a direction of a projection plane, corresponding to said image display plane, based on the view line deviation angle derived in said view line deviation angle deriving step;
an image generation step of generating an image, in the direction of the projection plane displaced by said direction displacing step; and
an image display step of displaying the image, generated in said image generation step, on said image display plane.

19. An image display apparatus comprising:
view line direction input means for inputting the direction of the view line of an operator, watching an image display plane, as a reference direction of said image display plane;
view line deviation angle deriving means for deriving a view line deviation angle which is formed by the central axis of said image display plane and the view line direction of the operator inputted by said view line direction input means;

direction displacing means for displacing a direction of a projection plane, corresponding to said image display plane, based on the view line deviation angle derived by said view line deviation angle deriving means;

image generation means for generating an image, in the direction of the projection plane displaced by said direction displacing means; and image display means for displaying the image, generated by said image generation means, on said image display plane.

20. A computer readable memory medium storing a program comprising:

a view line direction input module for inputting the direction of the view line of an operator, watching an image display plane, as a reference direction of said image display plane;

a view line deviation angle deriving module for deriving a view line deviation angle which is formed by the central axis of said image display plane and the view line direction of the operator inputted by said view line direction input module;

a direction displacing module for displacing the direction of the projection plane, determined by said projection plane direction determining module, based on the view line deviation angle derived by said view line deviation angle deriving module;

an image generation module for generating an image, in the direction of the projection plane displaced by said direction displacing module; and an image display module for displaying the image, generated by said image generation module, on said image display plane.

* * * * *

UNITED STATES PATENT AND TRADEMARK OFFICE
CERTIFICATE OF CORRECTION

PATENT NO. : 6,157,382
DATED : December 5, 2000
INVENTOR(S) : Toshikazu Ohshima et al.

It is certified that error appears in the above-identified patent and that said Letters Patent is hereby corrected as shown below:

Column 1,
Line 22, "have" (second occurrence) should read -- and have --.

Column 4,
Line 12, "these" should read -- this --.

Column 6,
Line 15, "provided" should read -- be provided --;
Line 43, "step by step" should be deleted; and
Line 44, "explained" should read -- explained step by step --.

Column 9,
Line 10, "be arbitrarily" should read -- arbitrarily be --;
Line 36, "in straight" should read -- straight in --; and
Line 37, "in straight" should read -- straight in --.

Column 12,
Line 29, "views" should read -- view --;
Line 40, "placed" (first occurrence) should read -- placed on -- and "placed is" should read -- is placed --;
Line 55, "step" should be deleted; and
Line 56, "by step explained" should read -- explained step by step --.

Column 13,
Line 37, "necessary" should read -- necessarily --.

Column 14,
Line 16, "S2906," should read -- S2906. --.

UNITED STATES PATENT AND TRADEMARK OFFICE
CERTIFICATE OF CORRECTION

PATENT NO. : 6,157,382
DATED : December 5, 2000
INVENTOR(S) : Toshikazu Ohshima et al.

It is certified that error appears in the above-identified patent and that said Letters Patent is hereby corrected as shown below:

<u>Column 15,</u>
Line 22, "heat" should read -- head --; and
Line 50, "same" should read -- the same --.

Signed and Sealed this

Fourth Day of December, 2001

Attest:

NICHOLAS P. GODICI
Attesting Officer   *Acting Director of the United States Patent and Trademark Office*